United States Patent
Bergen et al.

(10) Patent No.: US 9,338,944 B2
(45) Date of Patent: May 17, 2016

(54) VERTICAL STACKING BALE ACCUMULATOR

(71) Applicant: Phiber Manufacturing Inc., Crystal City (CA)

(72) Inventors: Harvey G. Bergen, Crystal City (CA); A. Philip Friesen, Crystal City (CA); Derek J. Friesen, Crystal City (CA)

(73) Assignee: PHIBER MANUFACTURING INC., Crystal City, Manitoba (CA)

( * ) Notice: Subject to any disclaimer, the term of this patent is extended or adjusted under 35 U.S.C. 154(b) by 0 days.

(21) Appl. No.: 14/164,819

(22) Filed: Jan. 27, 2014

(65) Prior Publication Data

US 2015/0208583 A1   Jul. 30, 2015

(51) Int. Cl.
*A01D 90/08* (2006.01)
*A01F 15/08* (2006.01)
*A01D 85/00* (2006.01)

(52) U.S. Cl.
CPC ........ *A01D 85/005* (2013.01); *A01D 2085/007* (2013.01)

(58) Field of Classification Search
CPC ........... A01D 85/005; A01D 2085/007; A01D 90/083; A01F 15/0875
USPC ........... 187/234; 198/359, 360, 361; 254/8 C, 254/8 R, 9 R; 280/461, 461.1, 490.1, 497; 296/50; 414/111, 245.5, 24.6, 458, 414/459, 789.7, 794.9, 795, 795.1, 795.2, 414/917, 933; 56/474, 475
See application file for complete search history.

(56) References Cited

U.S. PATENT DOCUMENTS

| | | | |
|---|---|---|---|
| 1,763,446 A | 6/1930 | Sancken | |
| 2,649,982 A | 8/1953 | Ray | |
| 3,086,665 A * | 4/1963 | Schmid | 414/790.3 |
| 3,138,238 A * | 6/1964 | De Good et al. | 198/367 |
| 3,189,387 A | 6/1965 | Nieto, Jr. | |
| 3,235,100 A * | 2/1966 | Raynor | 414/790.1 |
| 3,330,426 A * | 7/1967 | Bishop | A01D 85/005 198/418 |
| 3,564,771 A * | 2/1971 | Reynolds | 49/383 |
| 3,765,546 A * | 10/1973 | Westerling | 414/795.2 |

(Continued)

FOREIGN PATENT DOCUMENTS

| | | |
|---|---|---|
| DE | 2944527 A * | 5/1981 |
| DE | 4422311 A1 * | 12/1995 |

(Continued)

*Primary Examiner* — Gregory Adams
(74) *Attorney, Agent, or Firm* — Kyle R. Satterthwaite; Ryan W. Dupuis; Ade & Company Inc

(57) ABSTRACT

A towable vertical stacking bale accumulator features angle-adjustable roller beds on an obliquely oriented trailer frame whereby a rearwardly declining slope of the rollers gravitationally conveys individual bales from the baler to a stacking station at the rear of the trailer frame, where an automatically controlled gate provides a stop for retaining the bales until either a full stack is compiled or an error is detected. Spring loaded bale lifters feature concave undersides to encourage retraction of same as they are lowered down the sides of a newly arrived bale, and carry hanging bale guides that prevent the incoming bales from overshooting sides of the roller bed. Lift frames on which the bale lifters are carried are raised and lowered by hydraulically driven lift arms, and are further stabilized by engagement of lift frame followers with guide members of upright support structures provided on opposing sides of the roller bed.

19 Claims, 21 Drawing Sheets

(56) References Cited

U.S. PATENT DOCUMENTS

| | | |
|---|---|---|
| 4,053,064 A | 10/1977 | Stewart |
| 4,215,964 A | 8/1980 | Schrag et al. |
| 4,273,488 A * | 6/1981 | Hill et al. .................. 414/789.7 |
| 4,701,092 A * | 10/1987 | Reynaud .............. B65G 59/063 221/251 |
| 4,844,675 A | 7/1989 | Strosser et al. |
| 5,295,776 A | 3/1994 | Meijer |
| 5,362,189 A * | 11/1994 | Lindahl ....................... 414/24.5 |
| 5,477,668 A * | 12/1995 | Meijer .............................. 56/474 |
| 5,511,921 A | 4/1996 | Meijer |
| 5,829,238 A | 11/1998 | Branson |
| 5,842,823 A | 12/1998 | Kohnen et al. |
| 6,240,712 B1 | 6/2001 | Meijer |
| 6,851,908 B2 * | 2/2005 | Bergen et al. ................. 414/111 |
| 7,717,665 B2 * | 5/2010 | Jenkins ..................... 414/795.2 |
| 8,226,106 B2 * | 7/2012 | Hensley ..................... 280/490.1 |
| 2012/0045310 A1 * | 2/2012 | Kelderman ................... 414/801 |

FOREIGN PATENT DOCUMENTS

| | | |
|---|---|---|
| EP | 0687408 | 12/1995 |
| EP | 687408 A1 * | 12/1995 |
| EP | 0959661 | 12/1999 |
| EP | 2064936 | 6/2009 |
| GB | 2053081 | 2/1981 |

\* cited by examiner

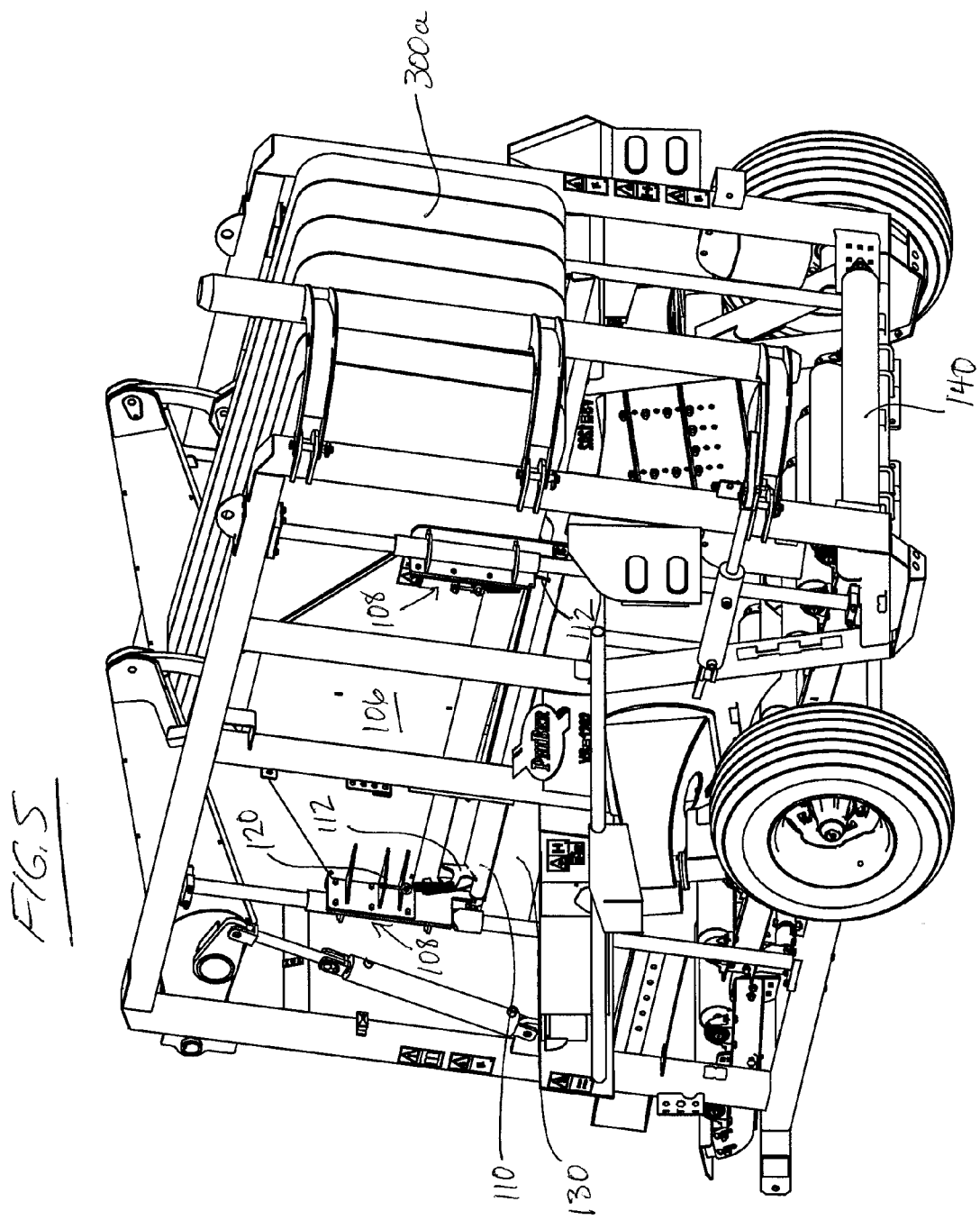

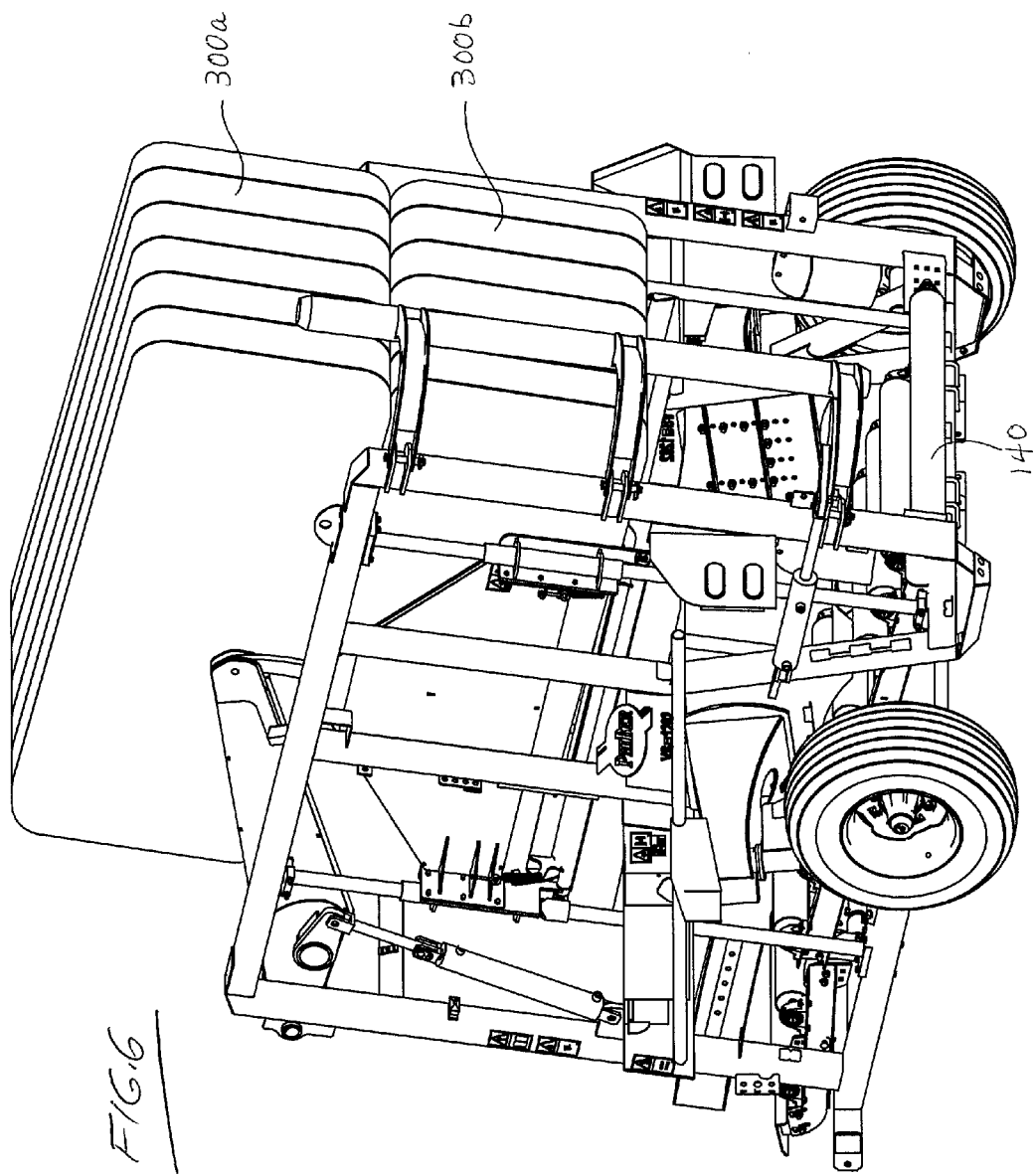

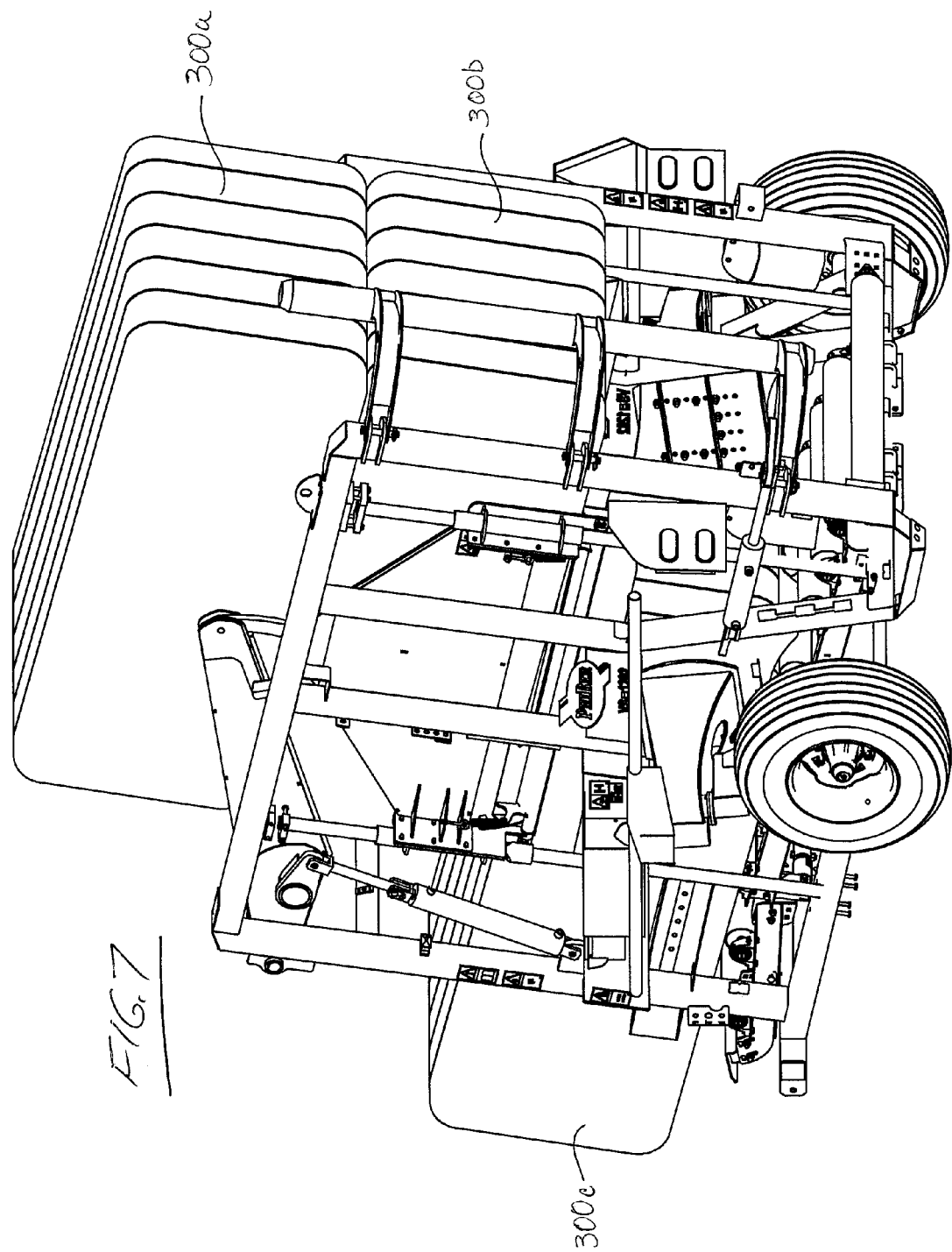

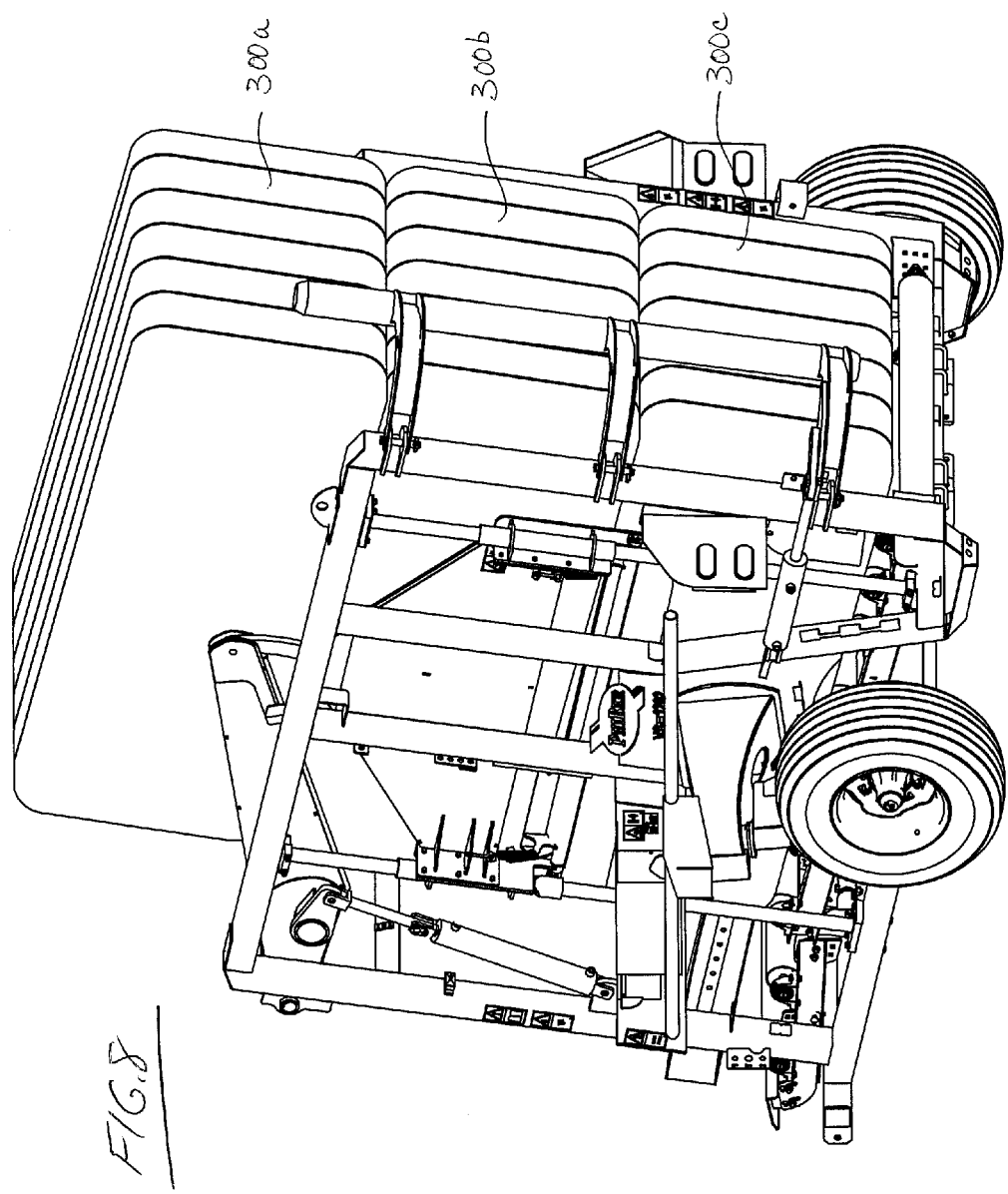

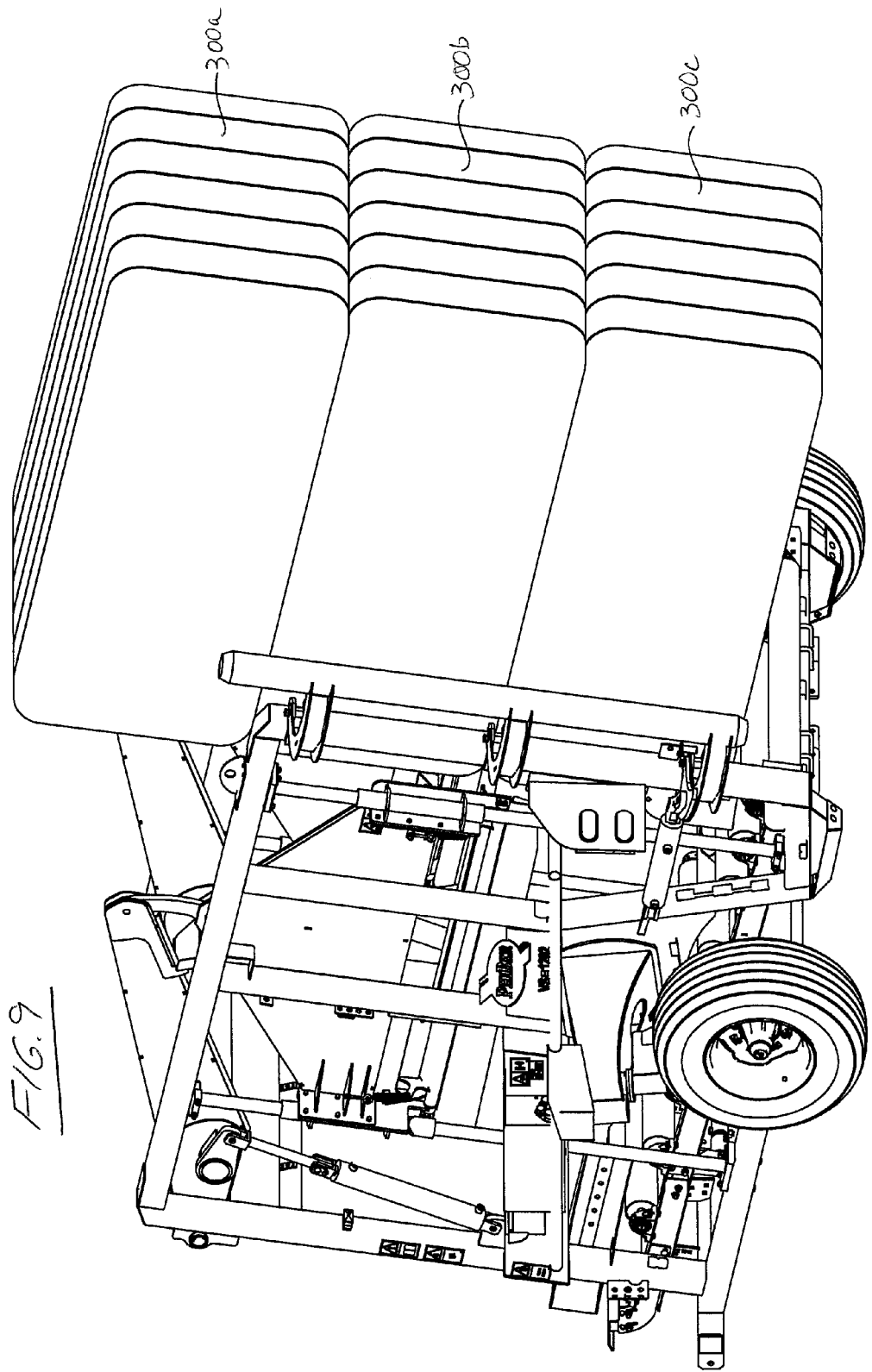

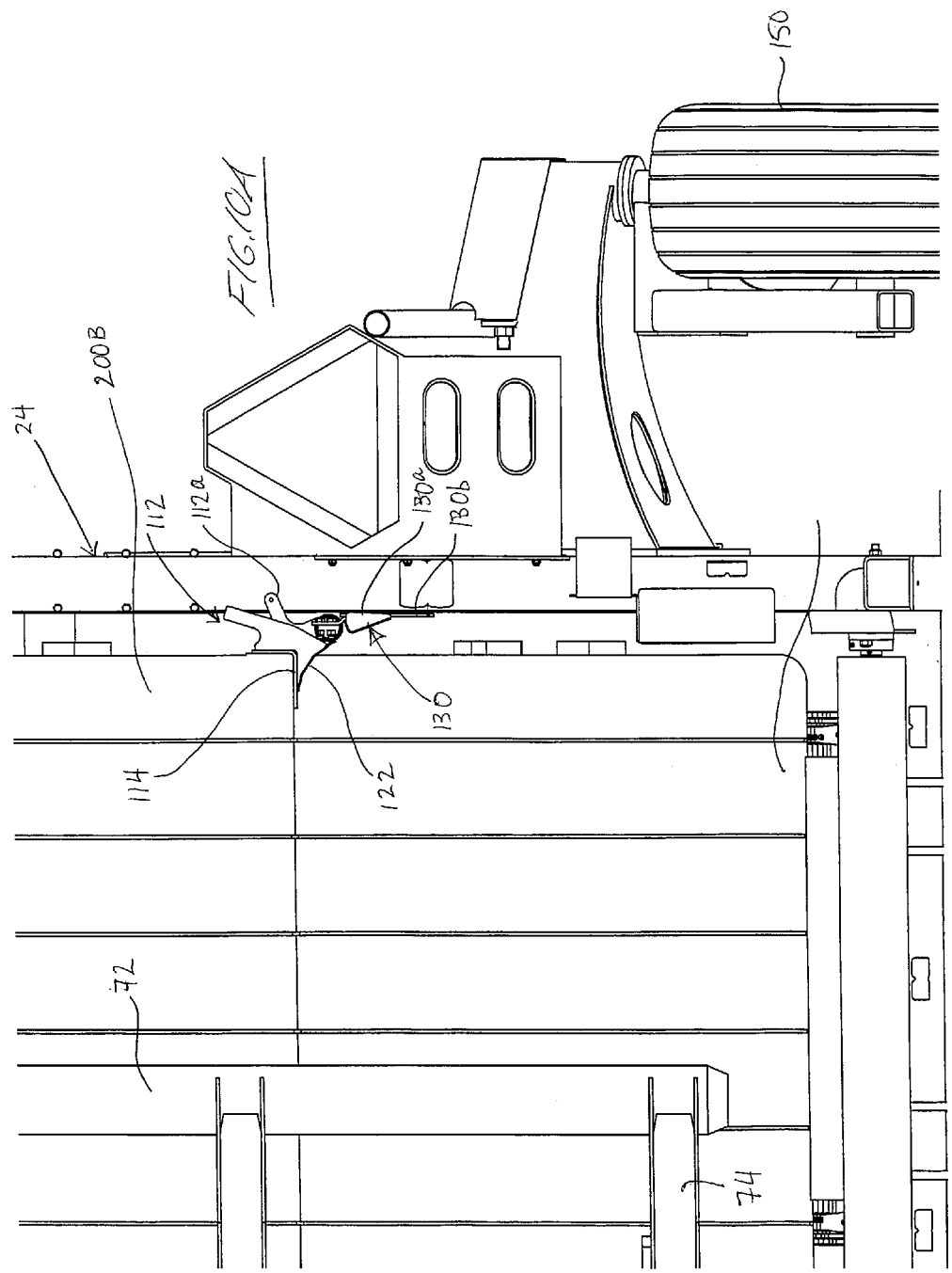

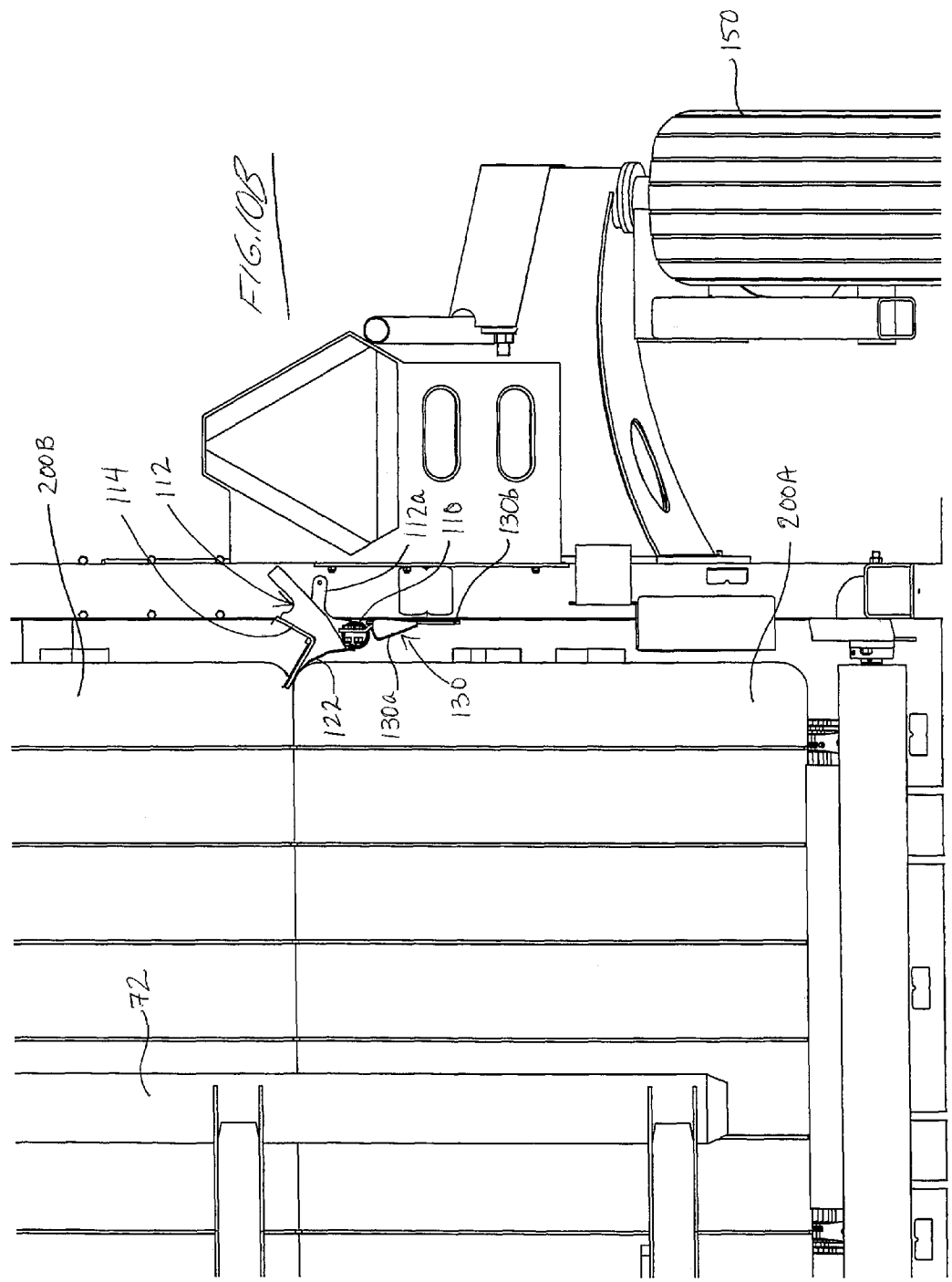

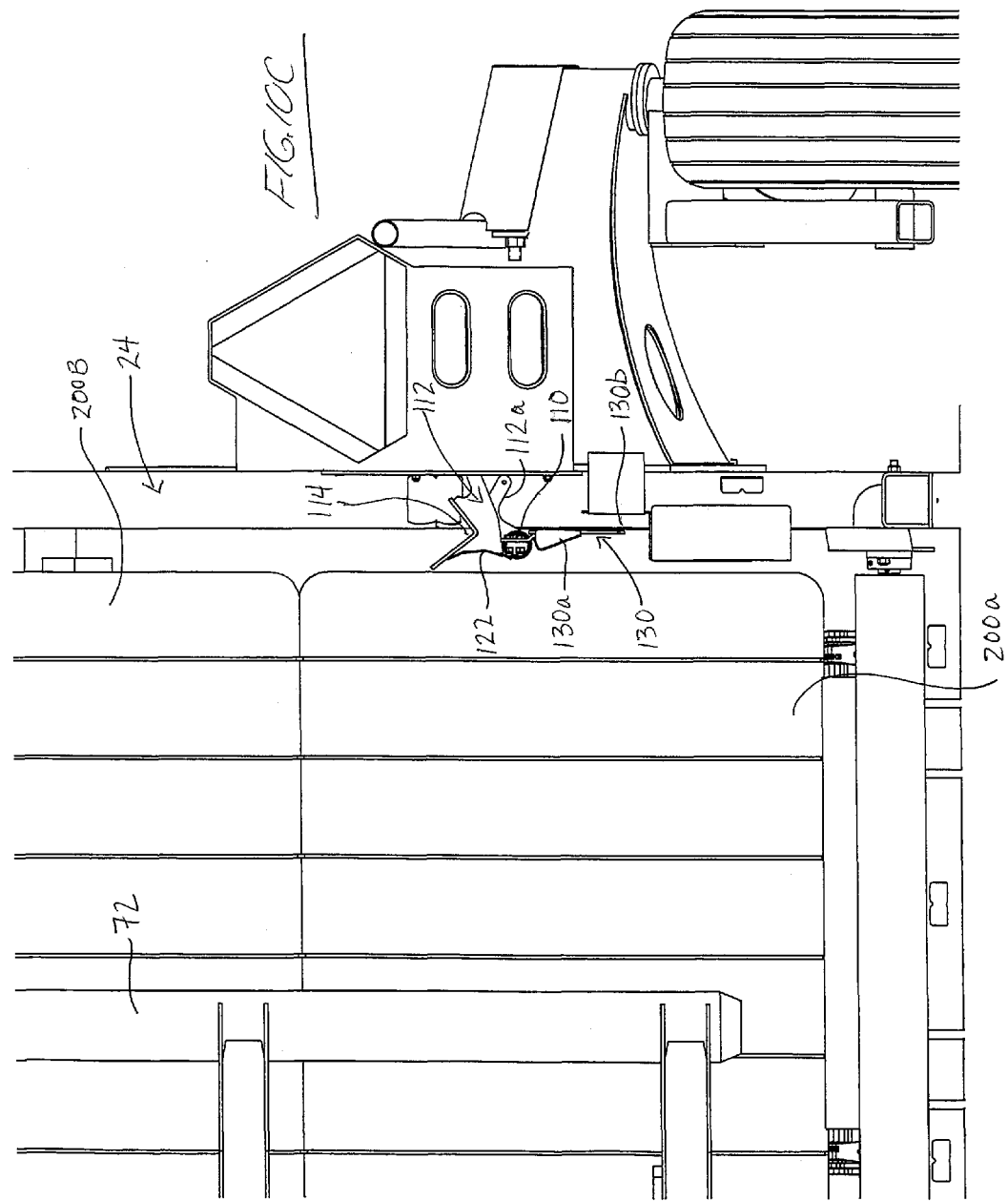

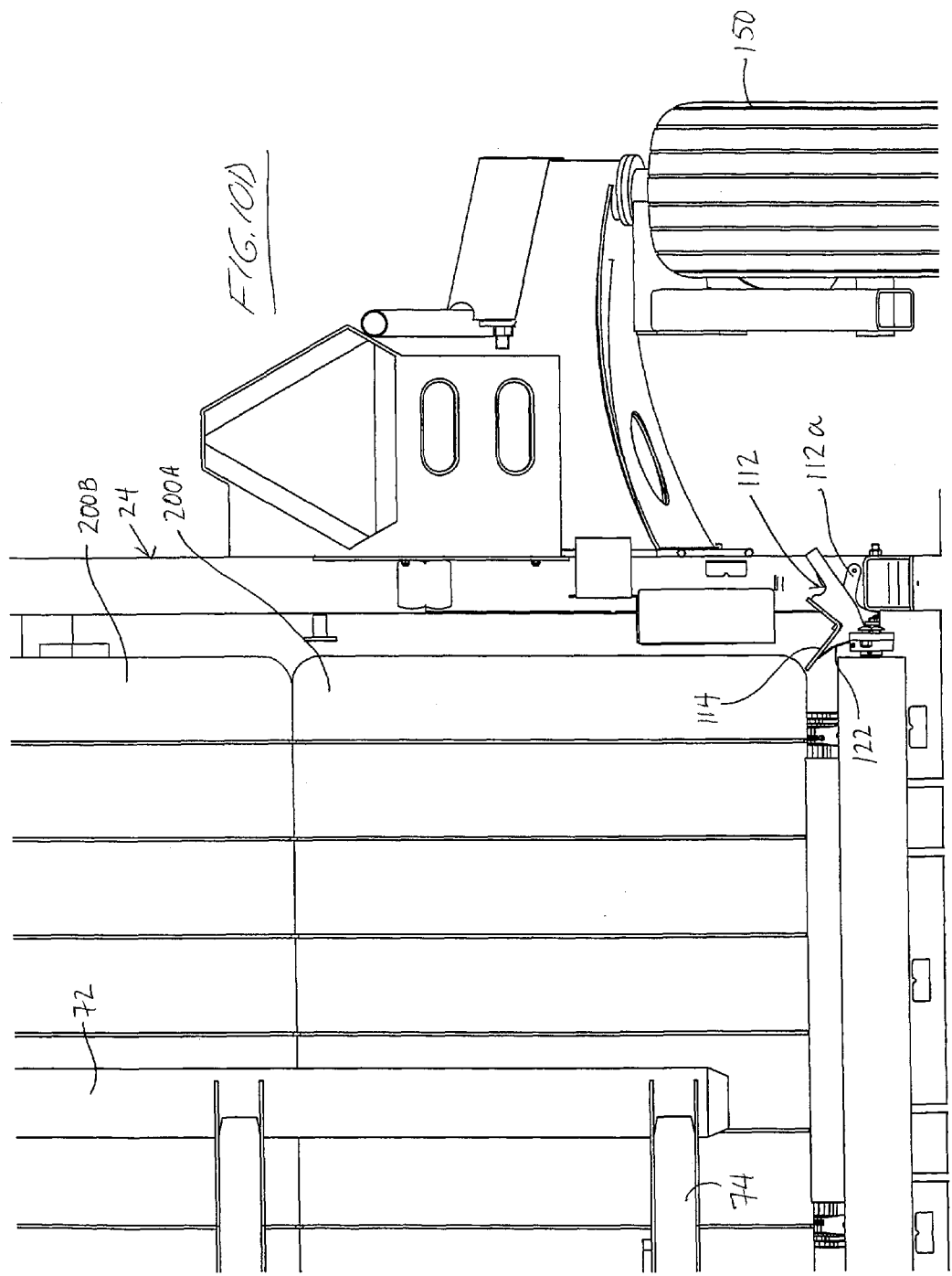

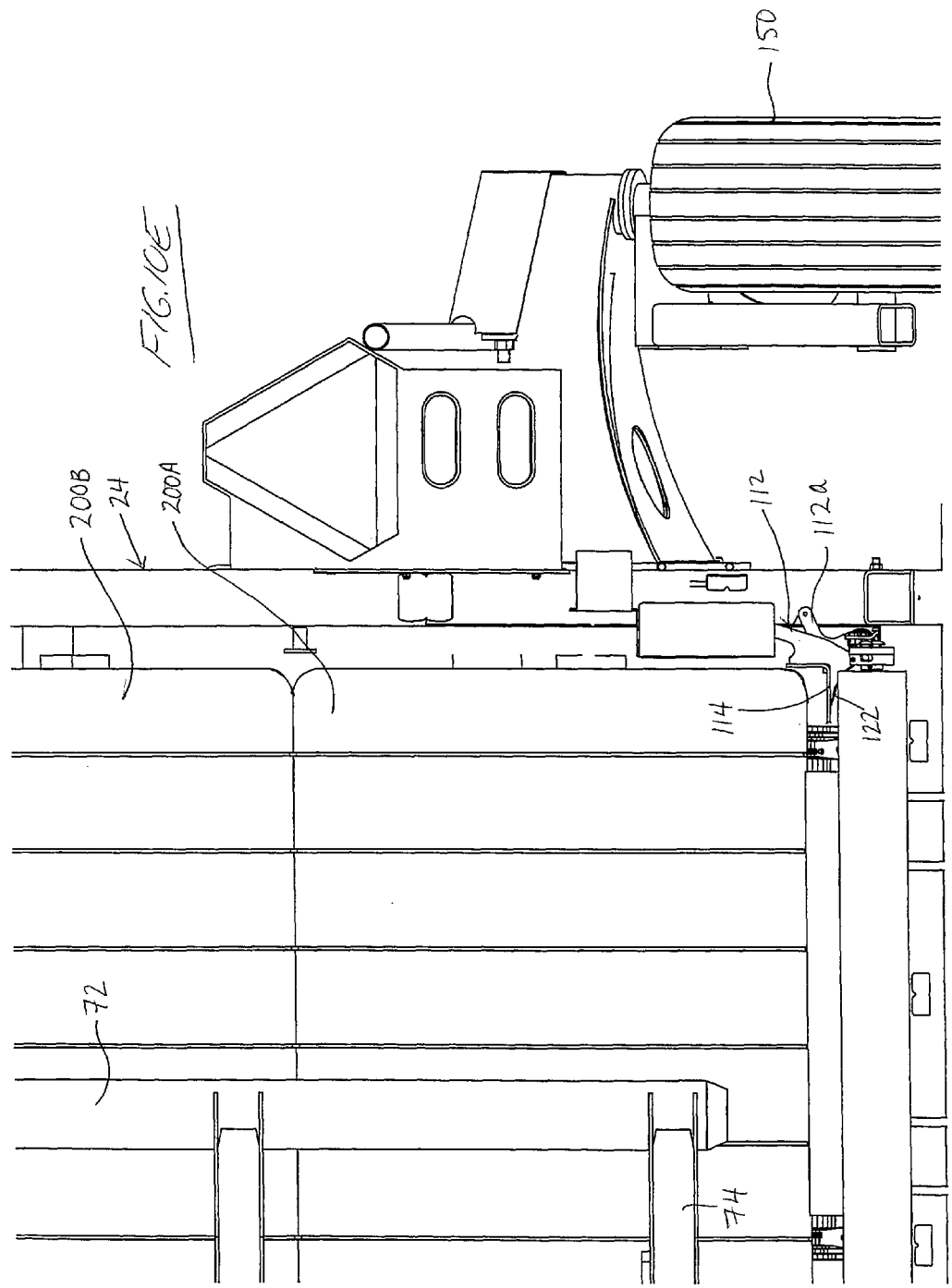

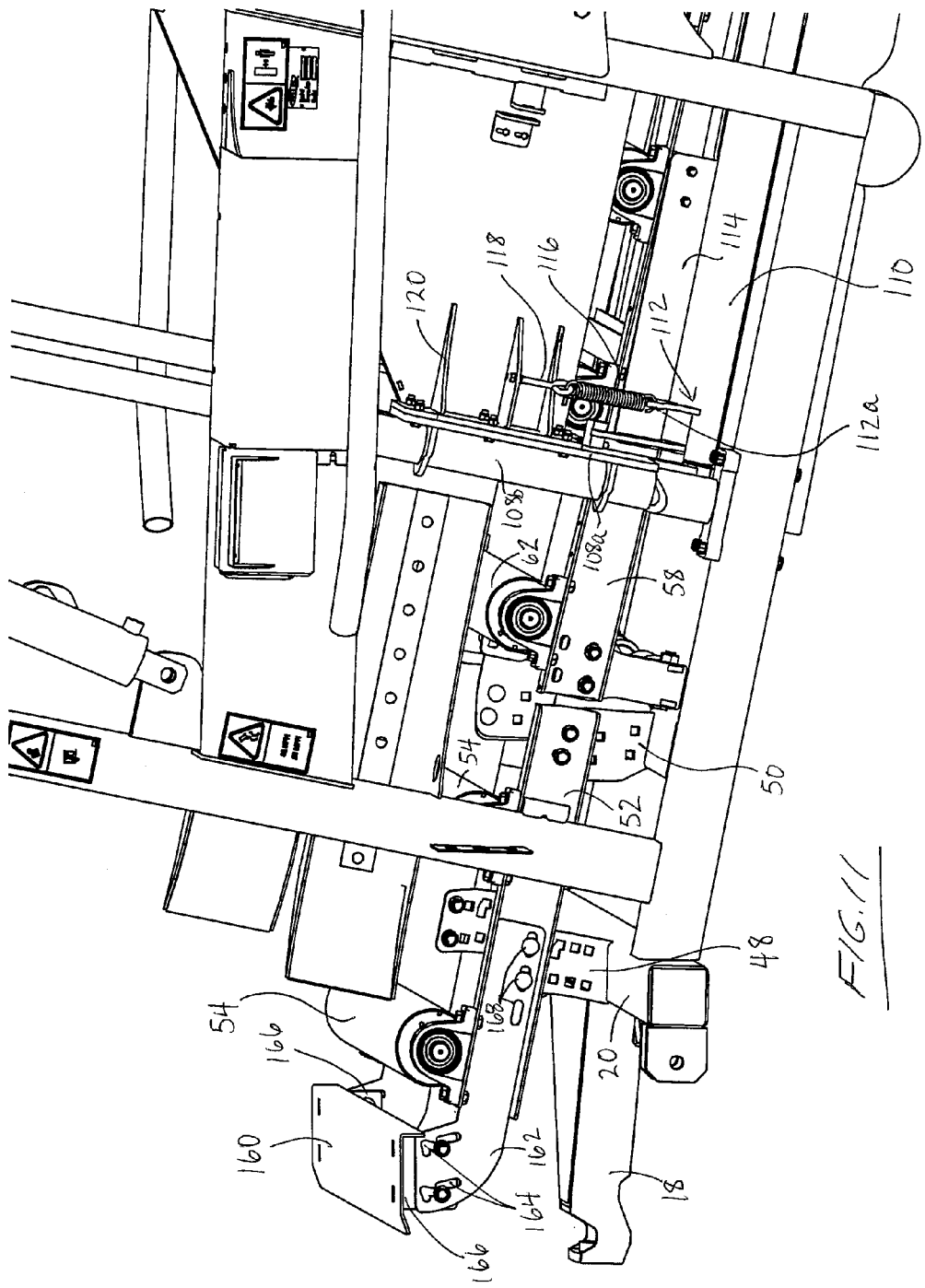

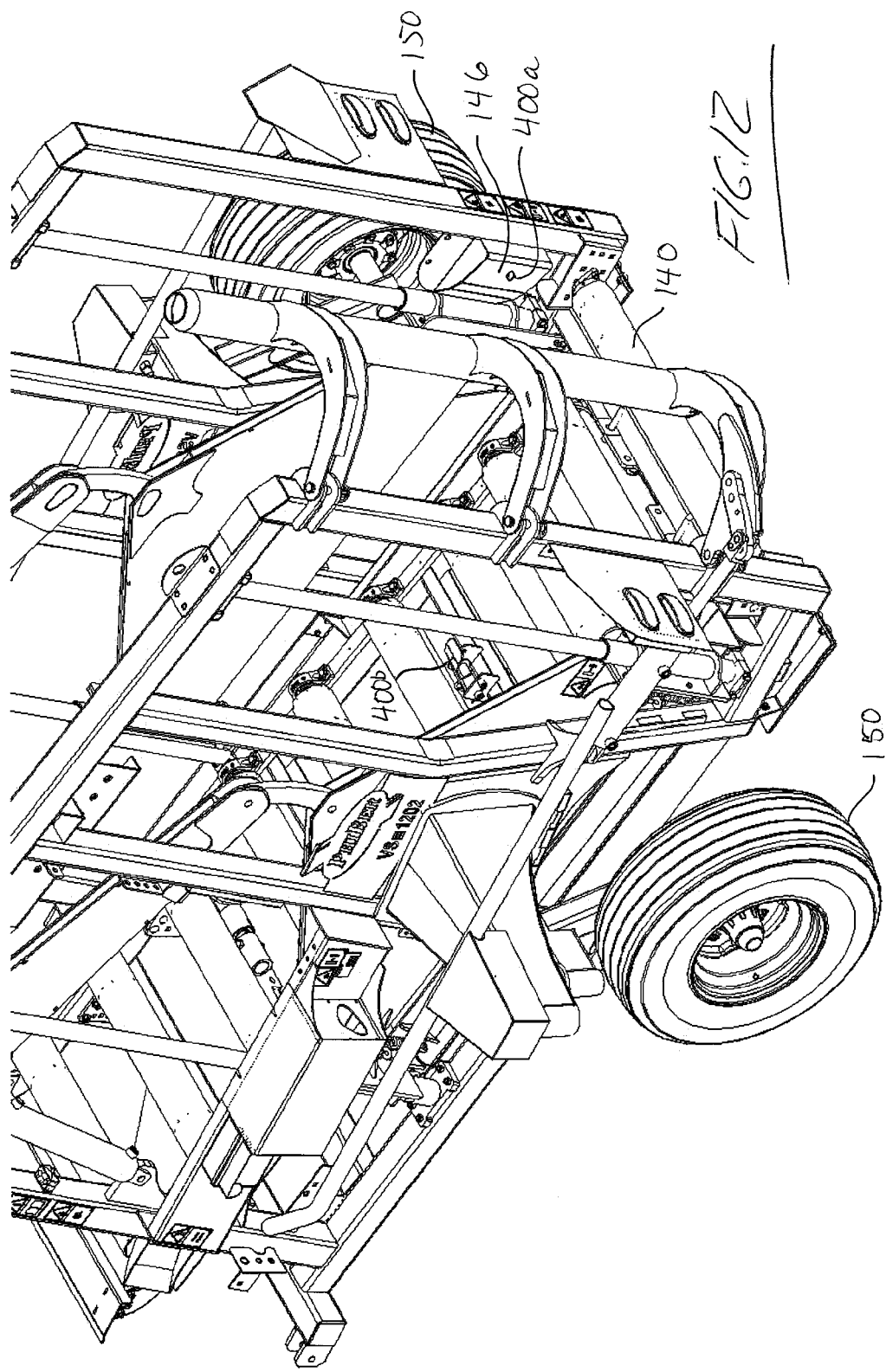

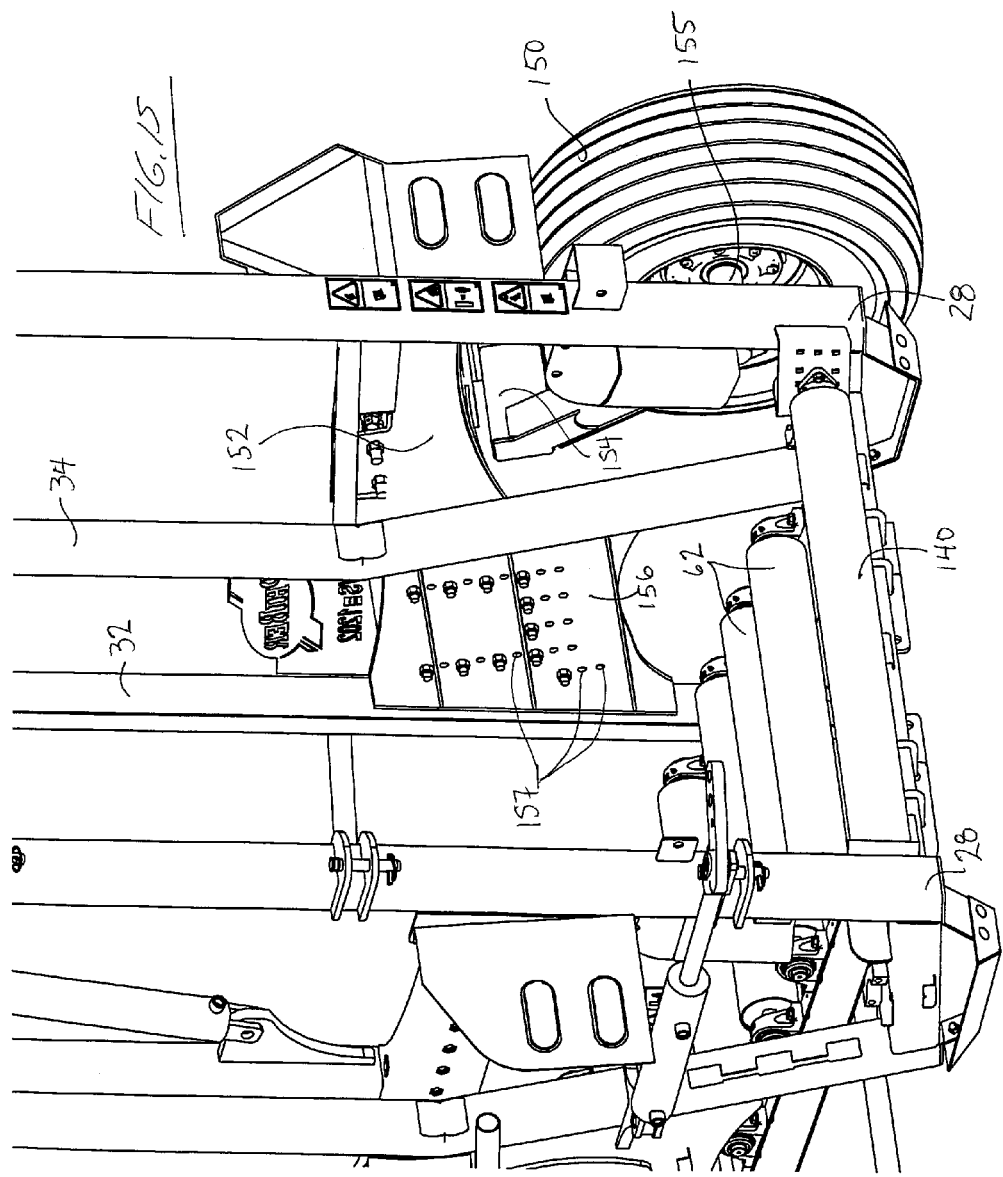

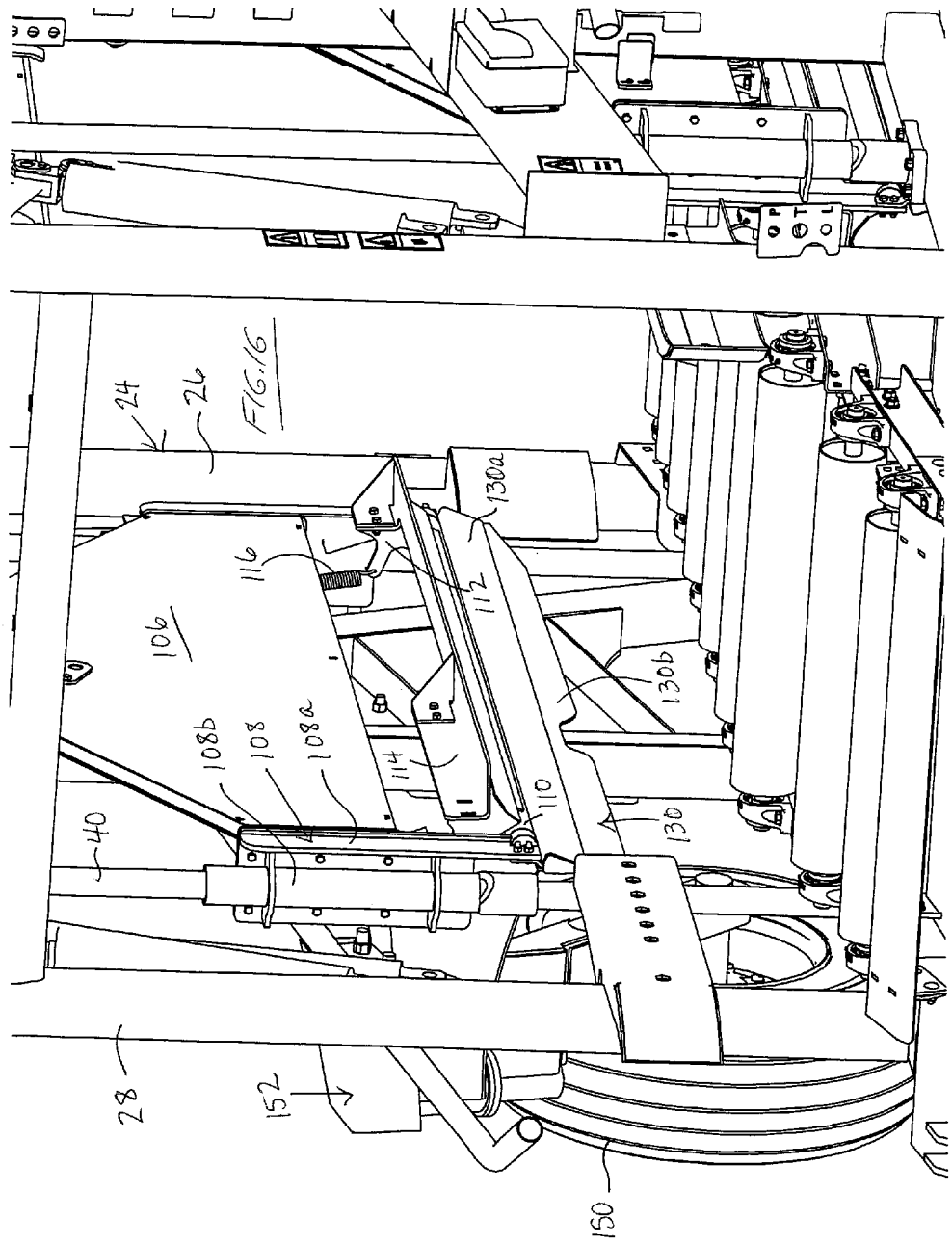

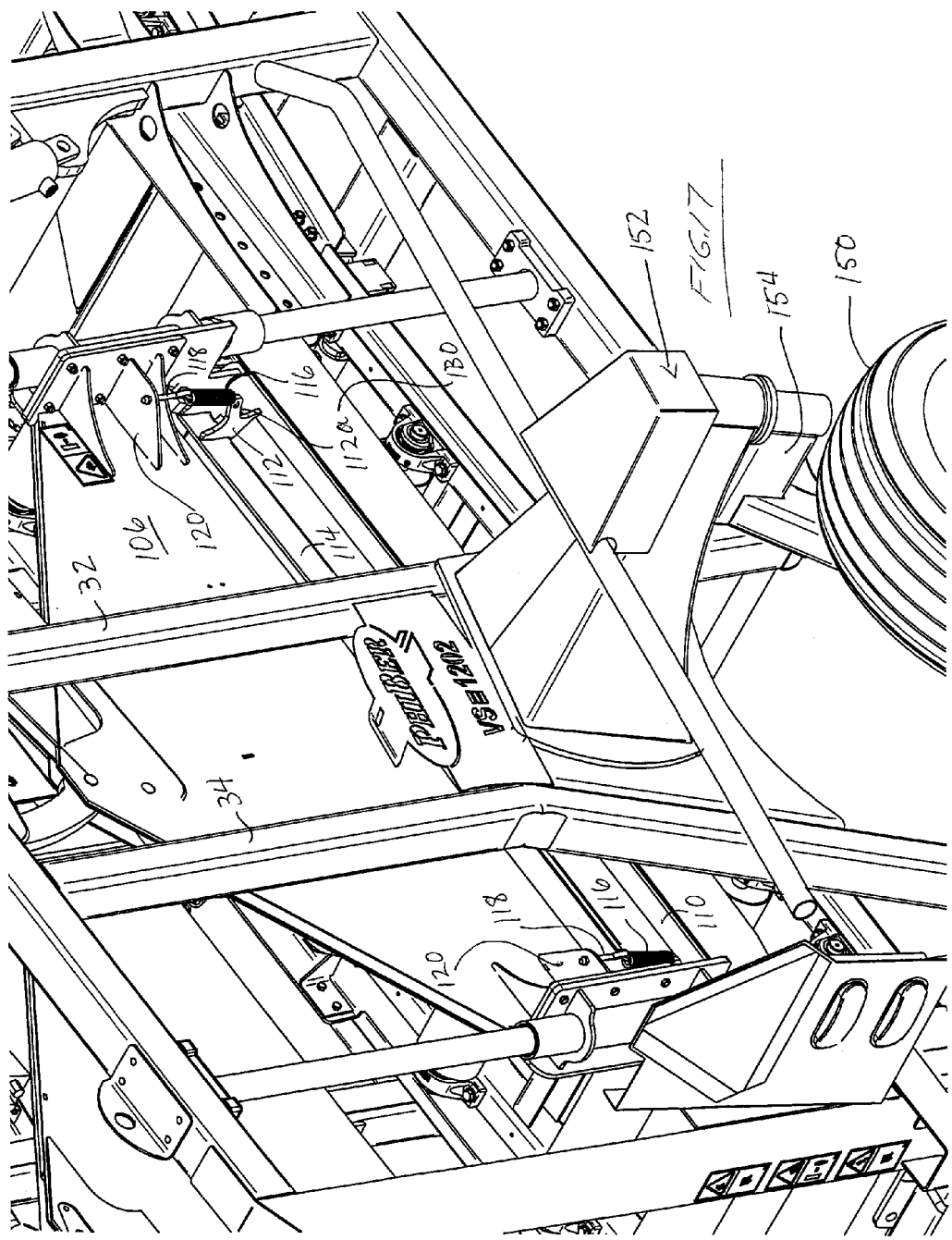

VERTICAL STACKING BALE ACCUMULATOR

FIELD OF THE INVENTION

The present invention relates generally to bale accumulators, and more particularly to bale accumulators configured for vertical stacking of rectangular bales ejected from the baler behind which the accumulator is towed.

BACKGROUND OF THE INVENTION

Balers and similar machines have been employed for many years in the agricultural industries for gathering and packaging agricultural crops, for example hay, into bales. The bales are then used for purposes including feeding livestock. As baler technology developed, and particularly with the advent of balers for producing large rectangular bales, bale accumulators were produced for towing behind the baler to collect a plurality of bales as they are individually ejected from the baler, and then deposit the collected plurality of bales in an organized group on the ground. Such deposit of multiple bales in a collective group provides greater efficiency in later collecting of the bales from the field compared to dropping of bales individually onto the ground directly from the baler.

The present invention relates particularly to bale accumulators that are configured to deposit an accumulation of rectangular bales on the ground in a vertical stack.

Vertical stacking accumulators are known in the art that arrange rectangular bales in a single vertical stack by lifting the first bales that arrives at a stacking station of the accumulator into an elevated position to accommodate conveyance of the next bale into a position underlying the elevated bale at the stacking station, whereupon the elevated bale is then seated atop the underlying bale to achieve a stacked condition of these two bales. The process of lifting the current bales at the stacking station to admit a next bale beneath them, and seating the lifted bales on the newly admitted lower bale may be repeated at least once, thereby creating a vertical stack of at least three bales. Examples of such vertical stacking accumulators are disclosed in European Patent Application Publications 0687408, 2064936 and 0959661. U.K. Patent Application GB 2053081 teaches a vertical stacking accumulator that likewise lifts bales from a first station to an elevated position to admit the next bale beneath the raised bales, but instead of then lowering the raised bales down onto the latest bale, it instead then feeds the latest bale upwardly to a platform level at which the previously raised bales are situated.

The disclose accumulator of the present application follows this same general stacking routine as the forgoing prior art, raising the first bale to admit the next bale on which the first bale is then seated, but includes several unique features that are lacking in the prior art accumulators and are believed to provide notable advantage over same.

Other types of bale accumulators known in the art, but also differing significantly from the present invention, are disclosed in U.S. Pat. No. 1,763,446 by Sancken, U.S. Pat. No. 2,649,982 by Ray, U.S. Pat. No. 3,189,387 by Nieto Jr., U.S. Pat. No. 4,053,064 by Stewart, U.S. Pat. No. 4,215,964 by Schrag et al., U.S. Pat. No. 4,844,675 by Strosser et al., U.S. Pat. No. 5,829,238 by Branson, U.S. Pat. No. 5,842,823 by Kohnen et al., U.S. Pat. No. 6,851,908 by Bergen et al., U.S. Pat. Nos. 5,295,776, 5,477,668, 5,511,921 and 6,240,712 by Meijer.

SUMMARY OF THE INVENTION

According to one aspect of the invention there is provided a vertical stacking bale accumulator comprising:

a trailer frame having opposing front and rear ends spaced apart in a longitudinal direction and opposing sides horizontally spaced apart in a transverse direction;

a hitch connection mounted to the front end of the trailer frame for coupling the accumulator to a tow hitch of a baler;

a set of ground wheels rollably supporting the trailer frame adjacent the opposing sides thereof proximate the rear end of the trailer frame;

a series of non-powered rollers lying transversely of the trailer frame and spaced apart from one another along the longitudinal direction from adjacent the front end of the trailer frame to adjacent the rear end of the trailer frame, the series of non-powered rollers including front and rear groups of rollers residing respectively adjacent the front and rear ends of the trailer frame;

a bale stacking mechanism installed on the trailer frame and arranged to automatically maneuver sequentially-received individual bales into a stacked configuration atop the rear rollers;

a rear gate movably carried on the trailer frame proximate the rear end thereof for movement between a closed position obstructing deployment of the bales from the rear end of the trailer frame and an open position allowing deployment of the bales from the rear end of the trailer frame; and a control system arranged to automatically move the rear gate from the closed position to the open position upon accumulation of a predetermined number of stacked bales atop the rear rollers;

wherein the trailer frame, the hitch connection, the ground wheels and the series of non-powered rollers are positioned relative to one another in a manner placing the rear group of rollers in an order of sequentially descending elevation toward the rear end of the trailer frame with the hitch connection coupled to the baler so as to gravitationally bias the bales toward the rear end of the trailer frame.

Preferably the bale stacking mechanism and the control system are arranged to lift an initial bale into an elevated state from atop the rear of rollers upon arrival of said initial bale at said rear group of rollers from the front group of rollers, to maintain said elevated state of the initial bale until a next bale arrives at said rear group of rollers, and release said initial bale onto said next bale.

Preferably there are a pair of upright support structures mounted to the trailer frame and spaced apart from one another in the transverse direction across the series of non-powered rollers, each upright support structure comprising a pair of upright guide members spaced apart from one another in the longitudinal direction of the trailer frame on the same side of the conveyance path, with the bale stacking mechanism preferably comprising:

a lift arm arrangement comprising at least one lift arm having a pivotal connection at an elevation above the trailer frame for movement of the lift arm arrangement about a pivot axis lying in the transverse direction;

at least one actuator carried on the trailer frame and arranged to effect pivoting of the lift arm arrangement about the pivot axis;

a pair of lift frames spaced apart from one another in the transverse direction across the series of non-powered rollers and suspended from the lift arm arrangement adjacent a lifting end thereof distal to the pivot axis, each lift frame comprising a pair of followers attached thereto at longitudinally opposite ends of the lift frame, each follower being engaged to a respective one of the upright guide members for constrained movement upward and downward therealong; and a pair of bale engaging devices respectively carried on the pair of lifting frames and operable to engage a bale seated on the rear group of rollers from opposing sides thereof for subsequent lifting of said bale from said rear group of rollers by raising of the lifting end of the lift arm arrangement by the at least one actuator.

Preferably the lift arm comprises two lift arms from which the pair of lift frames are respectively suspended and two actuators that each drive motion of a respective one of the lift arms about the pivot axis, each lift arm being positioned on a respective side of the series of non-powered rollers.

Preferably each bale engaging device comprises at least one lifter that is pivotal about a longitudinal axis, is biased by a spring force into a default position in which a free edge of a lift pad of said lifter points inwardly toward a transverse center of the series of non-powered rollers, and is movable against the spring force into a retracted position in which the free edge is tilted upward and transversely outward relative to the default position, whereby the retracted positions of the lift pads clear the opposing sides of the bale during downward movement therealong to the lowered position, at which point the lift pads return to the default position to reach under the bale from the opposing sides thereof for lifting of the bale.

Preferably each lifting pad is elongated in the longitudinal direction to span at least a majority length of each bale.

Preferably an underside of each lifter that faces downward and transversely inward in the default position of the lifter is concavely contoured.

Preferably there are provided a pair of bale guides suspended respectively below the bale engaging devices and extending in the longitudinal direction to block movement of an incoming bale from overshooting either of the opposing sides of the series of non-powered rollers.

Preferably each bale guide comprises a downwardly tapered portion that narrows in a direction moving away from a top end of the bale guide toward a bottom end thereof.

Preferably the rear gate comprises an upright blocking member and at least one bracket carrying said blocking member at a position adjacent the rear end of the trailer frame and a respective one of the sides thereof, the bracket being pivotally supported for pivotal movement thereof about an upright axis and having a curved shape reaching rearwardly and inwardly to face concavely toward the front end of the trailer frame in the closed position to place the upright blocking member at an intermediate location between the opposing sides of the trailer frame.

Preferably gate actuator coupled to the rear gate to effect movement thereof is coupled to the rear gate adjacent a lower end thereof.

Preferably the rear gate is adjustable in position to accommodate varying bale lengths by adjusting a distance between the rear gate and front end of the trailer in the longitudinal direction thereof.

Preferably the rear gate comprises a shear pin connection arranged to release the gate from the closed position under application of a predetermined rearward force by one or more bales stacked atop the rear group of rollers.

Preferably at least some of the series of non-powered rollers are adjustable in position relative to the frame.

Preferably the front and rear groups of the non-powered rollers are independently adjustable in position relative to the frame.

Preferably each group of rollers is mounted on a respective sub-frame, which is adjustable in position relative to the trailer frame. The sub-frame may comprise a pair of longitudinal support rails on which bearings are mounted in aligned pairs to rotatably support the rollers in positions spanning transversely between the support rails.

Preferably there is an additional rear discharge roller situated rearwardly beyond the rear group of rollers and adjustable in height relative to the frame independently of the front and rear groups of rollers.

Preferably an adjustable mounting arrangement for at least some of the non-powered rollers enables adjustment of an angle of inclination between the frame and a plane containing rotational axes of said at least some of the non-powered rollers.

Preferably the ground wheels are adjustable in height relative to the trailer frame to adjust angle of inclination of the trailer frame relative to ground for a given height of a particular baler hitch.

Preferably the control system comprises front and rear sensors positioned respective adjacent the front and rear ends of the trailer frame to detect presence of bales on the front and rear groups of non-powered rollers, and the control system is arranged to automatically open the rear gate upon detecting simultaneous presence of bales at both the front and rear groups of rollers.

Preferably there is provided a hitch mount for installation on the baler, the hitch mount comprising a plurality of selectable connections points via which the hitch connection of the accumulator is connectable to the hitch mount, the plurality of connection points being vertically spaced from one another such that selection from among said plurality of connection points sets a height of the hitch connection of the accumulator relative to the baler.

Preferably there is provided a bale transition plate carried forwardly of the front group of rollers to provide a sliding support surface over which bales transition from the baler to the front group of rollers.

Preferably the bale transition plate is adjustable in position relative to the trailer frame.

Preferably the bale transition plate is adjustable in elevation relative to the trailer frame.

Preferably the bale transition plate is adjustable in longitudinal position relative to the trailer frame.

According to a second aspect of the invention there is provided a vertical stacking bale accumulator comprising:

a frame having a bale conveyance path running in a longitudinal direction for movement of bales in said longitudinal direction toward a stacking area of said conveyance path;

a pair of upright support structures spaced apart from one another in a transverse direction across the stacking area of said conveyance path, each upright support structure comprising a pair of upright guide members spaced apart from one another in the longitudinal direction on the same side of the conveyance path a lift arm arrangement comprising at least one lift arm having a pivotal connection at an elevation above the conveyance path for movement of the lift arm arrangement about a pivot axis lying in the transverse direction;

at least one actuator carried on the trailer frame and arranged to effect pivoting of the lift arm arrangement about the pivot axis;

a pair of lift frames spaced apart from one another in the transverse direction across the stacking area of said conveyance path and suspended from the lift arm arrangement adjacent a lifting end thereof distal to the pivot axis, each lift frame comprising a pair of followers attached thereto at longitudinally opposite ends of the lift frame, each follower being engaged to a respective one of the upright guide members for constrained movement upward and downward therealong; and a pair of bale engaging devices respectively carried on the pair of lifting frames and operable to engage an initial bale seated atop the stacking area of said conveyance path from opposing sides thereof for subsequent lifting of said bale from the stacking area of the conveyance path by raising of the lifting end of the lift arm arrangement by the at least one actuator to accommodate conveyance of a next incoming bale into the stacking area beneath the initial bale.

According to a third aspect of the invention there is provided a vertical stacking bale accumulator comprising:

a frame having a bale conveyance path running in a longitudinal direction for movement of bales in said longitudinal direction toward a stacking area of said conveyance path;

a pair of bale engaging devices respectively disposed on opposing sides of the stacking area of the conveyance path and each arranged for upward and downward displacement relative to the conveyance path into and out of a lowered position and for engagement of an initial bale seated at the stacking area from opposing sides thereof while in the lowered position for subsequent lifting of said bale from said stacking area of the conveyance path by raising of the bale engaging devices to accommodate conveyance of a next incoming bale into the stacking area beneath the initial bale; and a pair of bale guides suspended respectively the bale engaging devices and extending in the longitudinal direction to block movement of the next incoming bale from overshooting either of the opposing sides of the conveyance path.

According to a fourth aspect of the invention there is provided a vertical stacking bale accumulator comprising:

a frame having a bale conveyance path running in a longitudinal direction for movement of bales in said longitudinal direction toward a stacking area of said conveyance path; and a pair of bale engaging devices respectively carried on opposing sides of the stacking area of said conveyance path and each arranged for upward and downward displacement relative to a said conveyance path into and out of a lowered position and for engagement of an initial bale seated at the stacking area of said conveyance path from opposing sides thereof while in the lowered position for subsequent lifting of said initial bale from said conveyance path by raising of the bale engaging devices;

wherein each bale engaging device comprises at least one lifter that is pivotal about a longitudinal axis, is biased by a spring force into a default position in which a free edge of a lift pad of said lifter points inwardly toward a transverse center of the conveyance path and is movable against the spring force into a retracted position in which the free edge is tilted upward and transversely outward relative to the default position, whereby the retracted positions of the lift pads clear the opposing sides of the bale during downward movement therealong to the lowered position, at which point the lift pads return to the default position to reach under the bale from the opposing sides thereof for lifting of the bale.

BRIEF DESCRIPTION OF THE DRAWINGS

In the accompanying drawings, which illustrate an exemplary embodiment of the present invention:

FIG. 5 is a rear left perspective view of the vertical stacking accumulator with a first individual bale raised into an elevated position at a stacking station of the accumulator to accommodate arrival of a second bale beneath the first bale.

FIG. 6 is a rear left perspective view of the vertical stacking accumulator with the first bale stacked atop a second bale, and the two bales raised into the elevated position to accommodate arrival of a third bale beneath the first bale.

FIG. 7 is a rear left perspective view of the vertical stacking accumulator illustrating arrival of the third bale beneath the elevated first and second bales.

FIG. 8 is a rear left perspective view of the vertical stacking accumulator showing a completed three-bale stack ready for release from the accumulator.

FIG. 9 is a is a rear left perspective view of the vertical stacking accumulator illustrating release of the three-bale stack to the ground behind the accumulator.

FIGS. 10A-10E are partial rear views of the vertical stacking bale accumulator with select components omitted to better illustrate operation of spring-biased lift pads that pivot outwardly away from the sides of a newly inserted bottom-bale as they move downwardly therealong from the elevated position at which the last-raised bale was stacked atop the newly inserted bottom-bale, before automatically pivoting back inward upon reaching a lowered position beneath the bottom bale for a subsequent lifting operation.

FIG. 11 is a partial close-up perspective side view of a front portion of the vertical stacking bale accumulator.

FIG. 12 is a partial rear left perspective of the vertical stacking bale accumulator of FIG. 2 from a different angle.

FIG. 15 is a partial rear left perspective view of the accumulator with select components omitted to reveal one of two matching mounting plates at side of the accumulator by which ground wheels thereof are mounted for adjustable height relative to the trailer frame.

FIG. 16 is a partial perspective rear view of the accumulator with a bale lifting mechanism in an elevated position to reveal details of a bale engagement mechanism thereon from a viewpoint inside a bale lifting station of the accumulator.

FIG. 17 is a partial perspective side view of the accumulator of FIG. 16 to illustrates details of the bale engagement mechanism from a viewpoint laterally outside the lifting station.

DETAILED DESCRIPTION

Figure 1:
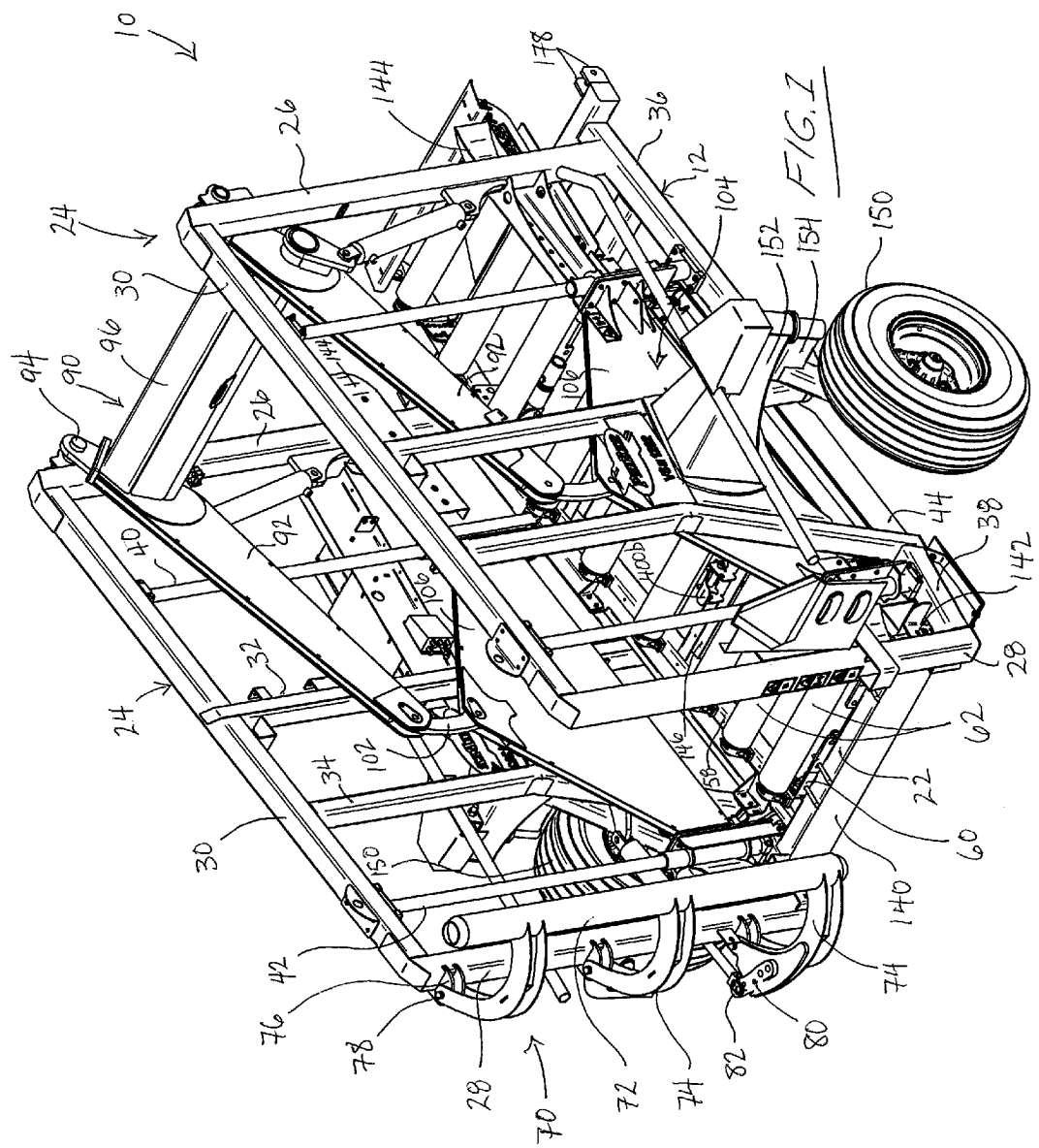
FIG. 1 is a rear right perspective view of a vertical stacking bale accumulator of the present invention.
Figure 2:
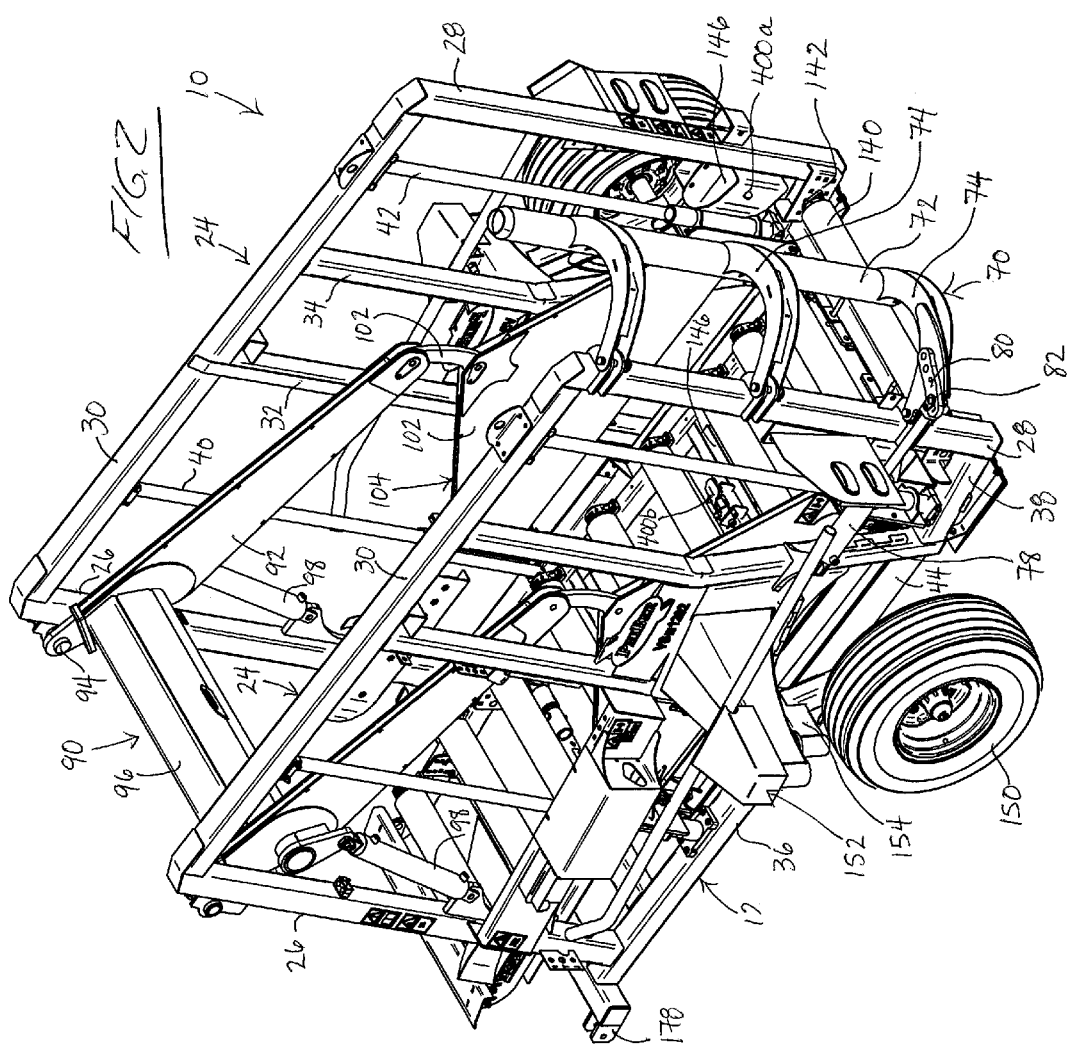
FIG. 2 is a rear left perspective view of the vertical stacking bale accumulator of the present invention.
Figure 3:
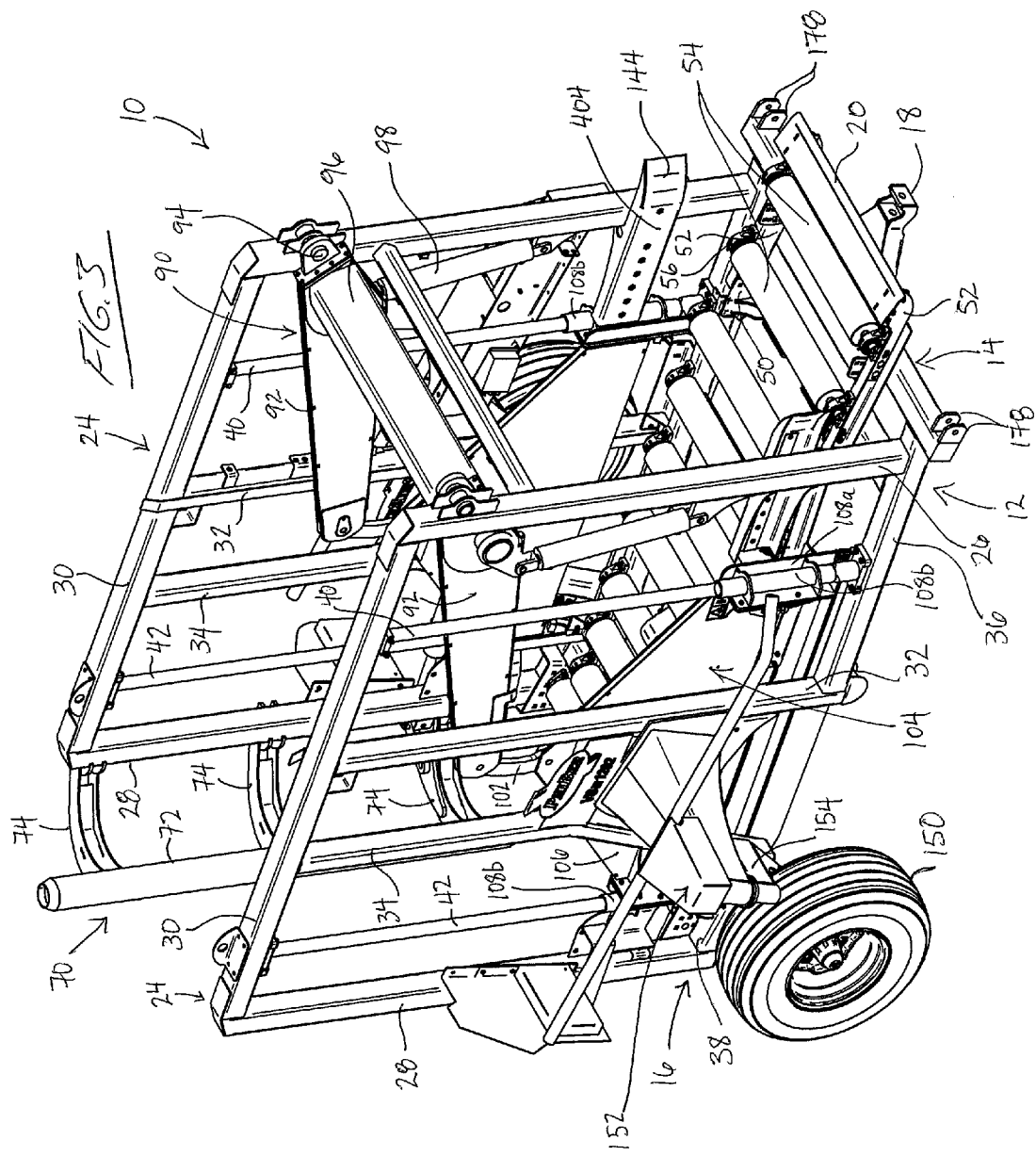
FIG. 3 is a front right perspective view of the vertical stacking bale accumulator of the present invention.
Figure 4:
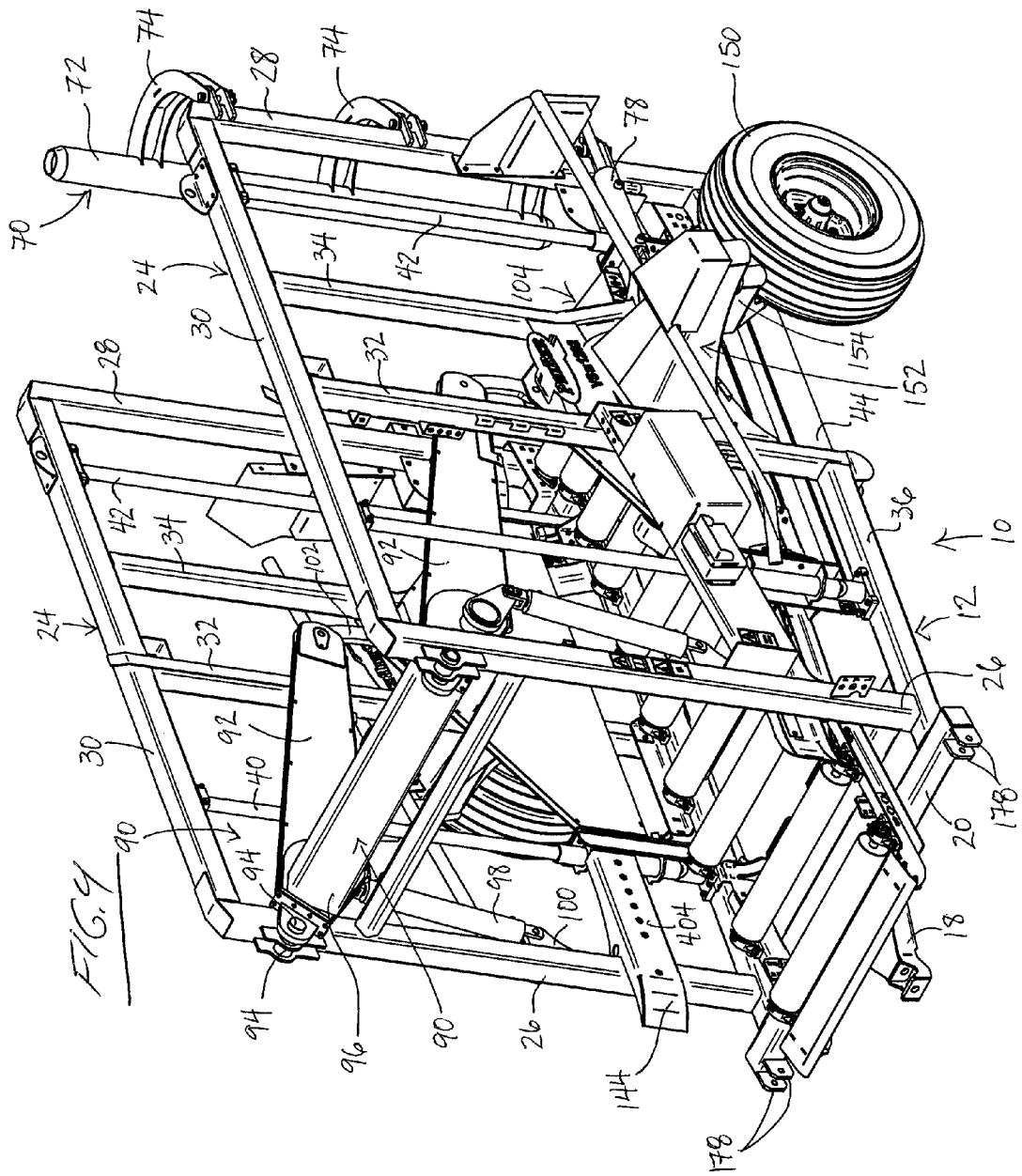
FIG. 4 is a front left perspective view of the vertical stacking bale accumulator of the present invention.
Figure 13:
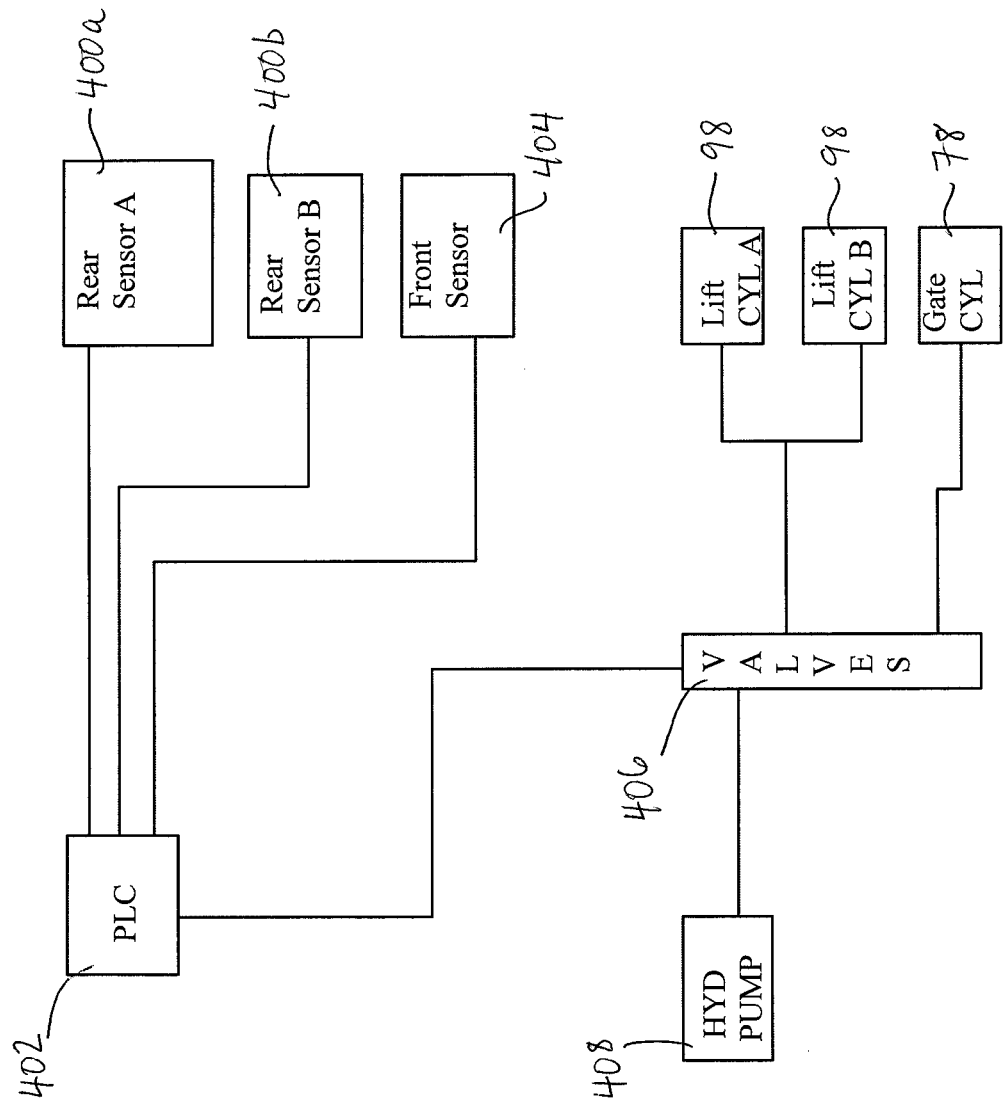
FIG. 13 is a schematic illustration of a control system for the vertical stacking bale accumulator.

FIGS. 1 to 4 illustrate a vertical stacking bale accumulator 10 of the present invention which features a generally rectangular trailer frame 12 having a front end 14 and an opposing rear end 16 spaced apart in a longitudinal direction. As shown in FIGS. 3 and 4, a hitch connector 18 is fixed to a front end cross-beam 20 of the trailer frame and extends forwardly therefrom for connection to the hitch H of a baler B (FIG. 14) for towed conveyance of the accumulator behind the baler in the longitudinal direction. The terms 'front' or 'forward' are thus used herein to denote the end of the accumulator that leads the opposing 'rear' or 'back' end when the accumulator is towed behind the baler.

As shown in FIGS. 1 and 2, a horizontal rear cross-beam 22 of the trailer frame 12 lies parallel to the front cross-beam 20 in a transverse direction perpendicular to the longitudinal direction. A pair of upright support structures 24 are spaced apart in the transverse direction to lie in vertical planes parallel to the longitudinal direction of the trailer frame at respective sides thereof. Each one of these structures 24 connects the front and rear cross-beams 20, 22 together near a respective pair of matching ends thereof. Each support structure 24 features a front upright frame post 26 standing perpendicularly upward at or near the front cross-beam 20, a parallel rear upright frame post 28 standing perpendicularly upward at or near the rear cross-beam 22, a header 30 lying perpendicularly to the frame posts 26, 28 to interconnect the top ends thereof in the longitudinal direction, and a pair of intermediate upright frame posts 32, 34 spanning perpendicularly downward from the header and having their lower ends connected to respective front and rear footer beams 36, 38 that are perpendicularly attached to the front and rear cross-beams 20, 22 respectively. Each upright support structure 24 further includes a pair of upright guide poles 40, 42 each residing between a respective one of the front and rear upright frame posts 26, 28 and a nearest one of the intermediate upright frame posts 32, 34. A stiffening plate 44 interconnects the front and rear footer beams 36, 38, whereby these three elements define a respective longitudinal side of the generally rectangular trailer frame 12.

A near-front intermediate cross-beam 46 lies parallel to the front cross-beam 20 at a short distance rearward therefrom in the longitudinal direction. A first pair of upright mounting brackets 48 are fixed to the front cross-beam 20 on opposite sides of the transverse center thereof to stand vertically upward therefrom, each lying in a vertical plane spaced inwardly from the respective longitudinal side of the trailer frame. A second pair of upright mounting brackets 50 are likewise attached to the intermediate cross-beam 46 in the same vertical planes as the first pair of brackets 48, and each slope upwardly and rearwardly toward the rear end of the trailer frame 12. A front roller assembly or roller bed features a pair of front support rails 52 lying in the longitudinal direction and each fastened to a respective one of brackets in the first and second pairs of brackets on the front and intermediate cross-beams, and a pair of cylindrical front rollers 54 that lie parallel to one another in the transverse direction. Each front roller is rotatably carried by a pair of pillow block bearings 56 respectively mounted on the two front support rails 52.

A rear roller assembly or roller bed features a pair of rear support rails 58 lying in the longitudinal direction and each having one end fastened to a respective one the mounting brackets 50 on the intermediate cross-beam 46, and the other end fastened to a respective one of two forwardly-extending mounting brackets 60 that are attached to the rear-cross beam 22 to lie in the same planes as the intermediate mounting brackets 50. A set of cylindrical rear rollers 62 lie parallel to one another in the transverse direction, each being rotatably carried by a pair of pillow block bearings respectively mounted on the two rear support rails 56. The front and rear roller assemblies are thus similar in structure, but differ in that the rear set of rollers is notably larger, with longer support rails and a greater number of rollers, particularly seven rollers in the illustrated embodiment. The number of rollers in each of the front and rear sets may vary from those of the illustrated embodiment.

The front and intermediate mounting brackets 48, 50 each feature a plurality of different-height mounting sites at which the support rails 52, 58 of the roller assemblies can be connected. For example, in the illustrated embodiment, the front and intermediate mounting brackets 50 each feature several pairs of bolt holes at which the respective end of the respective front support rail can be bolted to the bracket, each pair of bolt holes residing at a different height from the respective cross-beam 20, 46. Height adjustability of the front end of the rear support rails 58 is similarly provided, for example by way of a single pair of bolt holes in the intermediate bracket 50 that is spaced rearward from the multiple pairs of bolt holes in the same bracket 50 for the front support rails 52, and two or more pairs of bolts holes in each rear support rail 58 at different heights thereon for selective alignment of one pair of rail-holes with the single available pair of bracket holes. For each rail, front or rear, height adjustability thus may be provided by having more than one available bolting location in either the rail, the mounting bracket, or in both. These adjustable-height arrangements are presented as examples only, and other arrangements for adjusting the height of the front and rear ends of the front support rails and the front end of the rear support rails may alternatively be employed. In the illustrated embodiment, height adjustability is not provided at the rear end of the rear support rails, but other embodiments may incorporate such functionality.

The front and rear rollers collectively define a longitudinal pathway along which an individual rectangular bale of hay or other material is conveyed along the trailer frame upon ejection of the bale from the baler whose outlet is positioned slightly ahead of and slightly above the forwardmost roller when the accumulator is hitched to the baler B. The hitch connector 16 and the trailer frame 12 are tilted out of plane with one another so as to be separated by more than 180-degrees at their topsides, and by less than 180-degrees at their undersides. Accordingly, with reference to FIG. 14, when the hitch connector 16 is hooked up to the hitch H of the baler B and extends rearward therefrom, the trailer frame 12 slopes downwardly and rearwardly from the hitch connector at an oblique angle rather than extending horizontally straight in the rearward direction.

The selectable bolt hole pairs at the connection of the front end of the rear support rails 58 to the intermediate brackets 50 are arranged such that in any of the available mounting positions, the plane occupied by the axes of the identical rollers of the rear roller set is either parallel to the plane of the trailer frame 12, or sloped in a direction slanting rearwardly downward relative to the plane of the trailer frame. With the use of same-size rollers, this slope of the plane containing the axes of the rear rollers means that the plane of contact between the rollers and a bale riding over the rollers (i.e. a common tangential plane of the rear rollers at the topsides thereof) is likewise sloped. In combination with the rearward and downward slope of the trailer frame, this relative slope of the rear roller set plane with respect to the trailer frame 12 means that the rollers 62 of the rear set will always decrease in elevation from one roller to the next moving in the rearward direction.

As a result of this downward slope of the rear roller set, no motive force for conveying the bales rearwardly along the longitudinal path of the accumulator is required. None of the front and rear rollers 54, 62 are rotationally driven in any way, but rather are all non-powered, free-rotating rollers. The ejection force applied to a bale as it exits the baler, as applied by a plunger thereof, displaces the rear end of the bale onto the front rollers, which are turned by frictional contact with the bale to encourage further rearward displacement thereof along the roller-lined longitudinal bath of the accumulator. As the bale reaches a position lying atop the rear set of rollers, it likewise frictionally engages the same to rotate the rear rollers and continue moving rearwardly on the longitudinal path of the accumulator, as gravitationally encouraged by the downward slope of the rear roller set in the longitudinal direction.

The adjustable height of the front roller support rails at both the front and intermediate cross-beam allows the height and slope of the front set of rollers to be adjusted relative to the trailer frame. The bolt holes of the mounting brackets are configured to allow the front roller set to be set in an aligned position coplanar with the rear roller set, or other planes sloped relative thereto, for example to allow the plane of the front rollers to be set parallel or nearly parallel to the discharge plane P of the baler outlet (FIG. 14) so as to maximize a smooth transition from the baler to the accumulator to minimize the potential for jams or bale damage. In addition, adjustment of the front and rear roller planes relative to one another to provide the rear roller set with a downwardly rearward slope relative to the front roller set acts to encourage better separation of sequentially adjacent bales exiting the baler, as movement of the rear end of a bale rearwardly past the rearmost front roller will place the rear end of the bale in a position hanging over the rear roller plane, whereby gravity will eventually tip the rear end of the bale downward onto the rear rollers, thereby tilting the front end of the bale rearwardly to encourage better separation from the next bale trailing it out of the baler.

A rear gate assembly 70 is mounted to the rear upright frame post 28 of the one of the upright support structures 24. The gate assembly 70 features an upright blocking member 72 lying parallel to the upright frame post 28 at distance spaced horizontally therefrom. A plurality of curved or arc-shaped gate brackets 74 each have one end fixed to the blocking member 72 at a respective position therealong and another end pivotally coupled between respective mounting lugs 76 on the upright frame post by a pivot pin 78. The gate brackets 74 and attached blocking member 72 are pivotable about a shared axis of the pivot pins, which lies parallel to the upright frame post 28. FIGS. 1 to 4 show the gate assembly in a closed position in which the blocking member 72 lies at an intermediate location between the two upright structures 24, and more particularly at a vertical plane disposed intermediately between the vertical planes of the rear support rails 58 on which the rollers 62 are rotably mounted. This way, when in the closed position, the blocking member 72 obstructs passage of a bale or stack of bales from out of the space between the two upright structures 24 adjacent the rear end of the frame, which defines a stacking station at which bales are lifted and compiled into a vertical stack. FIGS. 5 through 8 illustrated blocking of rearward discharge of bales from the accumulated by the closed gate assembly 70. On the other hand, FIG. 9 shows the gate assembly 70 swung laterally outward from the closed position into an open position in which the blocking member 72 is withdrawn laterally outward from between the upright vertical structures 24 at the sides of the trailer frame 12 to allow gravitational discharge of a stack of bales from the accumulator.

With reference to FIG. 2, movement of the gate assembly between the open and closed positions is provided by a suitable actuator, as defined in the illustrated embodiment a hydraulic cylinder 78 having its cylinder end pivotally attached to the rearmost one of the intermediate upright frame posts 34 of the respective support structure 24 at the outside thereof. The rod end of the hydraulic cylinder is pivotally coupled to an intermediate link 80 that is releasably fastened to a respective one of the arc-shaped gate brackets 74 and extends laterally outward from the link 80 to a point beyond the respective upright support structure 24. The intermediate link 80 has multiple bolt holes therein from which a user can select for the purpose of attaching the link 80 to the gate bracket 74. Use of a different one of the bolt holes 80 in the intermediate link changes the distance from the pivot axis of the gate assembly 70 to the point on the link 80 at which the cylinder rod is pinned, thereby changing the travel distance experienced by the gate assembly about its pivot axis for a given travel length of the cylinder's piston rod. By reducing the travel distance of the gate about its pivot axis under extension of the cylinder 78, the position of the blocking member 72 in the longitudinal direction when the gate is closed is shifted further rearward, allowing bales to hang further from the rear end of the trailer frame when abutted against the gate, thereby accommodating a greater length of bale in the stacking station of the accumulator. Where a baler configured for short bale lengths is used, the closed position of the blocking member 72 can be shifted forward to better position the bale relative to the pickup or lifting mechanism at the stacking station when the bale is in a lift-ready position in abutment with the blocking member 72 of the gate assembly 70.

The use of curved gate brackets 74 whose arc-shape curves firstly inwardly and rearwardly and then forwardly and inwardly so as to face concavely forward in the longitudinal direction has been found to better avoid breakage of the bale strings during opening of the gate versus a flat gate structure that would extend straight across the rear of the stacking station, as the upright blocking member 72 carried on the curved brackets forms the sole area of contact with the bale at a narrow upright strip near the transverse center of the bale. As shown, the blocking member 72 is preferably cylindrical in shape, whereby the curved periphery of the blocking member where its front side contacts the bales further reduces any damage to, or catching on, the bales. The connection of the gate cylinder 78 to the lowermost one of the gate brackets 74 in FIGS. 1 to 4 is preferable over the top-bracket attachment in FIGS. 5-9, as testing has found the gate to experience most of its loading at its lower portion, and lower placement of the cylinder has thus been found to better resist twisting of the gate under loading conditions. The hydraulic cylinder 78 is connected to the intermediate link 80 by a shear pin 82 of a selected strength configured to fail under the application of a rearward force on the gate that is less than the maximum plunger force of the baler, whereby in the event of hydraulic failure under which automated opening of the gate by the cylinder 78 does not occur, the shear pin 82 will fail and release the gate from the cylinder 78, thereby allowing the gate to automatically swing open under the force applied against the blocking member 72 by the stacked bales at the accumulator's rear-end stacking station.

Attention is now turned to the mechanism by which individually arriving bales fed onto the roller pathway of the accumulator from the baler are arranged into a single vertical stack at the stacking station adjacent the rear end of the trailer frame 12. A lift arm assembly 90 features a pair of identical lift arms 92 each disposed at the interior side of a respective one of the upright support structures 24 and pivotally supported thereon by a horizontal stub shaft 94 mounted to the front side of the upright frame post 26 of the support structure 24 near the header 30 thereof. An interconnecting box-beam 96 horizontally attaches the two lift arms 92 together in the transverse direction to encourage synchronous motion of the two arms 92 about their common horizontal pivot axis defined in the transverse direction by their aligned stub-shafts 94 and corresponding bearings. A respective hydraulic cylinder 98 is pivotally coupled between each lift arm 92 and a rearward lug 100 that is fixed to the respective front upright frame post 26. Each cylinder 98 extends upward and rearward from its mounting lug 100 and connects to the respective lift arm 92 within the longitudinal space between the front upright frame post 26 and the front guide pole 40 of the respective support structure 24. The two hydraulic cylinders 98 are operated in parallel to drive pivotal motion of the lift arms 92 about their shared pivot axis.

A respective arc-shaped hanger link 102 pivotally hangs from each lift arm 92 proximate a distal lifting end thereof that is furthest from the arm's pivot axis and resides in alignment with the space between the two intermediate upright posts 32, 34 of the respective upright support structure 24. A lift frame 104 is pivotally suspended from each arc-shaped hanger link 102. The lift frame 104 features a generally triangular panel 106 that is pinned to the hanger link 102 near an upper point of the panel's generally triangular shape for pivoting of the panel 106 relative to the hanger link 102 about a transverse horizontal axis parallel to that of the pivotal connection of the hanger link 102 to the lift arm 92. The panel 106 lies in a vertical plane adjacent and parallel to that of the respective support structure 24 on the inner side thereof, and overlies an open space that is left between the support rails 58 of the rear roller assembly and the support structure 24 in the transverse direction of the trailer frame 12. A bottom edge of the panel 106 lies parallel to the longitudinal side of the trailer frame 12. At opposite ends of this bottom edge of the panel 106, i.e. at tapered forward and rearward ends of the generally triangular panel 106, a pair of guide followers 108 are fixed to the panel. Each guide follower features a bracket 108a that is attached to the panel 106 and carries a rigid hollow cylinder 108b, which may be defined by metal pipe or tubing and is oriented axially upright in a position closing around a respective one of the guide poles 40, 42 of the respective upright support structure 24 for sliding displacement upward and downward therealong under raising and lowering of the lift arms 92 by the parallel pair of hydraulic cylinders 98. The sliding fit of the hollow cylinders 108b of the guide followers 108 on the guide poles 40, 42 restrains motion of the ends of the lift frame panel 106 to the parallel linear axes of the upright guide poles 40, 42, thereby preventing pivotal or tilting motion of the panels 106 about a horizontal axis. This provides stability to the lifting/stacking mechanism to maintain a consistent orientation of the bales handled thereby regardless of variations in bale sizes that may result in the weight of a given bale not being perfectly centered in the longitudinal direction relative to the pivotal support of the lifting frame panels 106 at the top peaks thereof.

Attention is now turned to devices carried on the lift frames to engage a bale that is seated on the rear rollers from opposing sides thereof for lifting of the bale under elevation of the lift frames via raising of the lift arms 92 by the parallel hydraulic cylinders 98. The two brackets 108a at each end of each lift frame panel 106 each carry a respective bearing whose rotational axis lies in the longitudinal direction at a spaced distance below the bottom edge of the panel 106. These two bearings on the end brackets 108a of each lift panel align with one another, and rotatably support a longitudinal shaft 110 that spans between them on their shared longitudinal axis. The shaft 110 is best seen in FIGS. 5 to 7 in which the lift frames are in an elevated position having lifted a bale from the rear rollers 62. Near each end of the shaft 110, a bracket plate 112 is welded or otherwise fixed to the shaft to lie in a plane perpendicular thereto. The two bracket plates 112 of each shaft 110 have matching shape and are in alignment with one another around the shaft axis. Each bracket plate 112 has a right-angle cutout on a side thereof that normally faces laterally inward toward the transverse center of the machine so that in this normal default position, one side of the right-angle cut out lies horizontally and faces vertically upward and the other side lies vertically and faces laterally inward toward the center of the machine. A respective length of angle iron 114 is fixed to the two bracket plates 112 on each shaft 110 to extend longitudinally between the bracket plates 112 in a position seated in the right-angle cutouts thereof so that the two legs of the angle-iron's right-angle cross-section seat against and match the orientation of the two sides of the right-angle cutouts in the bracket plates 112.

As best shown in FIG. 10E, with the bracket plates 112 and angle iron 114 in the normal default position, a lever portion 112a of each bracket plate 112 projects laterally outward from the rest of the bracket plate 112 at the outer side thereof opposite the right-angle cutout in which the angle iron 114 is seated. In this default position, the angle iron 114 lies just slightly inward from the vertical plane of the lift frame panel 106 in the transverse direction of the machine and just outside the vertical plane of the respective support rail 58 of the rear roller assembly. Still referring to FIG. 10E, when the lift frame is in its fully lowered position corresponding to the fully collapsed state of the lift cylinders 98, the angle iron 114 lies in the space between the respective rear support rail 58 and the upright support structure 24 on which the lift frame rides. In this fully lowered position, the upward-facing leg of the angle iron 114 lies at an elevation a short distance below a tangential bale-contact plane shared by the topsides of the set of rear rollers 62, and the inward facing leg of the angle iron reaches upward a short distance past this tangential contact plane of the rear rollers 62. The rear rollers of the apparatus are of a predetermined length that is somewhat exceeded by the expected bale-width, so that the bale supported on the rear rollers slightly overhangs both sides of the rear roller assembly so that the longitudinal bottom edge at each side of the bale overlies the upward facing leg of the angle iron 114 of the fully lowered bale engagement device on the respective lift frame.

Still referring to FIG. 10E, raising of the lift frames and attached bale engagement devices by the lift arms 92 from their lowermost position thus draws the upward facing legs of the angle irons 114 up against the underside of the bale at the longitudinal bottom side edges of the bale, whereby continued lifting of the lift frames acts to lift the bale upwardly from off the rear rollers. The upward facing legs of the angle irons 114 thus form respective lift pads whose distal edges point toward the transverse center of the machine in their default machine to reach under the bale when in the fully lowered position to enable lifting of the bale from off the rear rollers by these lift pads.

As best shown in FIG. 11, each bracket plate 112, and thus the angle iron 114 thereon, is biased into the described normal default position by a tension spring 116 that is hooked between a hole near the outermost distal end of the lever portion 112a and an eyebolt 118 that depends downward from a gusset plate 120 that is fixed between the outer side of the lift frame panel 106 and the respective one of the end brackets 108a thereof. In their default collapsed conditions, the tension springs 116 maintain the above-described normal default position of the bracket plates 112 and angle iron 114 of the bale engagement mechanism. A concave cutaway of each bracket plate 112 underlies the right-angle cutaway therein when in the default position, so that this concave cutaway faces downwardly and laterally inward. A concave plate 122 spans longitudinally from one bracket plate 112 to the other bracket plate 112 on the same lift frame panel 106 to lie parallel to the angle iron 114 therebeneath and provide a concave contour that conforms to that of the bracket plate cutaways over the full length of the bale engagement mechanism spanning the lengthwise bottom edge of the lift frame panel 106

The bale engagement device of each lift frame thus defines a lifter formed by the combination of the bracket plates 112, the lift pad angle irons 114 carried thereby, and the concave bottom plate 122 attached to the bracket plates. As described above with reference to FIG. 10E, these lifters are operable to reach beneath a bale that is seated atop the rear rollers for lifting of the bale therefrom by raising of the lift arms 92. The lift arm hydraulic cylinders 98 extend far enough from their collapsed positions to raise the lift frames and attached bale engagement devices by a height exceeding the height of the bales produced by the baler, whereby the bottom of the lifted bale is positioned high enough that a next bale from the baler can slide along the rollers into a position below the raised bale into abutment against the blocking member 72 of the rear gate 70. At this point, the two-way lift arm cylinders 98 are collapsed so as to lower the lift frames and bale engagement mechanisms back toward the lowered position.

The initial stage of this lowering motion is shown in FIG. 10A, where a newly introduced bale 200A underlies a previously raised bale 200B that was lifted to an elevated position over the rear rollers by the angle-iron lift pads 114. Lowering the lift frames on which the raised bale 200B is carried brings the concave bottom plate 122 of the lifters down against the top longitudinal side edges of the underlying bale 200A, the resistance of which forces this concave underside of the lifter to move upwardly and laterally outward about the axis of the longitudinal shaft 110 against the biasing force of the tension springs 116 that pull upwardly on the bracket plate levers 112a on the other side of the longitudinal shaft 110. The free distal edge of the lifting pad leg of the angle iron 114 thus tilts upwardly and outwardly, thereby withdrawing it from beneath the raised bale 200B, whereby the raised bale seats itself atop the underlying bale 200A. The curved underside 122 of the lifter helps to encourage the lifter to pivot outward in this manner, rather than being driven downward through the edge-adjacent portion of the underlying bale 200A. With reference to FIGS. 10B through 10D, the side of the bottom bale 200A continues to keep the lifter in its retracted position tilted outwardly from the bale-accommodating space of the stacking station until the distal free edges of the lift pads reach the bottom longitudinal side edges of the sides of the bottom bale 200A, whereupon the collapse of the tension springs 116 automatically forces the lifters back into their normal default position as they reach the lowered state at an elevation below the bottom bale 200A. Here, the stacking mechanism is ready to repeat the lifting process, thereby lifting the first two already-stacked bales 200A and 200B via the underside of the bottom bale 200A to allow introduction of third bale beneath them to form a three-high stack of bales.

As best shown in FIGS. 5, 7 and 10A-10C, an elongated hanging guide member 130 is attached to the two end brackets 108a of each lift frame just below the rotatably supported longitudinal shaft 110 so as to hang parallel to the shaft 110 in a position thereunder. This way, when the lift frames are in the raised position placing the bale engagement devices high enough to accommodate the next bale under the lifted bale(s), the hanging guide members 130 reach downward to an elevation lower than that the height of the next incoming bale arriving at the stacking station of the accumulator. Hanging just inside the respective upright support structure 24 on which the lift frames ride, each guide member 130 thus blocks a respective side of the bale from overshooting the respective side of the rear roller assembly too far and impacting the upright support structure 24 at this side of the trailer frame. The rear corner of a misshapen or mis-oriented bale coming out of the baler will thus run into the bale guide 130 and be guided longitudinally of the machine rather than jamming, catching or tearing in the framework of the support structure 24.

As best seen in 10A-10C, the transverse cross-section of each guide member 130 of the illustrated embodiment features a tapered or wedge-shaped upper portion 130a that reduces in width in a downward direction from the top end of the guide member, and a planar lower 130b portion depending further downward from the narrowed lower end of the upper portion. This way, during lowering of the lift frames from the elevated position after lifting of one or more bales, if the bottom bale is offset more to one side of the machine than the other, the sliding of the downwardly tapered guide members down along the two sides will impart a centering action on the bale, nudging the overshot side of the bale laterally inward toward the center of the machine to reduce the likelihood of the respective lifter catching on the top longitudinal side edge of the bottom bale as it is conveyed downward therepast toward the fully lowered position.

When the lift frames are in the fully lowered position, during arrival of the first one of the bales to be placed in the stack, it is the panels 106 that instead provide the bale guiding function to prevent the incoming bale from overshooting the sides of the roller path and encourage longitudinal alignment of the bale therewith.

Having described the bulk of its structure, operation of the accumulator is now described with reference to FIGS. 5 to 9. A first bale 300a is ejected from the outlet of the baler by the plunger thereof, thus being forced rearwardly on the front rollers of the accumulator into a position reaching over an initial few of the rear rollers, at which point the bale automatically tips rearwardly downward under gravity due to the oblique inclination of the rear set of rollers, whereby the bale continues automatically rearward over the unpowered rear rollers of the accumulator, which thus lacks need for of any powered bale-conveyance means along the longitudinal path of the machine. One or more position sensors 400a, 400b proximate the rear end of the trailer frame detect arrival of this first bale at the lift-ready position abutting the contact member 72 of the rear gate, thus marking the arrival of the bale at the stacking station defined at this rearward area of the longitudinal roller path. Preferably two sets of sensors are used at the rear of the machine, for example an electronic optical sensor 400a and a mechanical switch 400b tripped by actual physical contact by the bale, whereby a 'presence detected' signal from the electronic sensors triggered by a operator inspecting the rear of the machine will not alone trigger any actuation of the stacking mechanism or gate actuators.

Upon receiving indication from the rear sensors of successful arrival of the first bale at the stacking station, a programmable logic controller (PLC) 402 or suitable control configuration checks for a similar 'presence detected' signal from a similar bale-detection sensor 404 proximate the front of the trailer frame. If no bale is detected at the front of the machine (i.e. the next bale from the balder has not yet reached the position of the sensor in the longitudinal direction of the accumulator frame 12), then the controller proceeds to initiate a bale-lifting action on the first bale 300a. If a bale is detected at the front of the machine, it is recognized as an indication that this earlier than expected arrival of the next bale at the front rollers relative to the detected arrival of the first bale at the lift-ready position means than there is insufficient time to raise the first bale before the second bale will reach the stacking station, and the controller thus actuates opening of the rear gate 70 to allow the first bale 300a to exit the rear of the accumulator alone and fall to the ground without first attempting to stacking the first bale on the second bale.

However, provided that no simultaneous front and rear presence of bales is detected, the controller initiates the above described bale-lifting action on the first bale at the stacking station by controlling appropriate valving 406 between a hydraulic pump 408 of the accumulator and the parallel hydraulic cylinders 98 to extend these cylinders and thereby effect raising of the lift arms 92. FIG. 5 shows this state where the first bale 300a has been lifted to accommodate receipt of an expected second bale beneath same.

The controller maintains the extended state of the lift arm cylinders 98 until arrival of a second bale at the stacking station is confirmed by the rear sensors, at which time the controller switches the state of the control valving to cause collapse of the lift arm cylinders 98 so as to lower the lift frames and bale engaging devices, thereby seating the elevated first bale 300a atop the newly arrived second bale 300b and returning the bale lifters to their fully lowered position. At this point, provided that a third bale has not yet been detected at the front of the accumulator (based on which an early gate opening procedure would be initiated as described above in view of an insufficient window of time for raising the stacked first and second bales before arrival of a third bale at the rear of the machine), the lift process is repeated, whereby the stacked first and second bales 300a, 300b are lifted, as shown in FIG. 6, to accommodate displacement of a third bale 300c along the roller-lined conveyance pathway into a position beneath the first two bales at the stacking station, as shown in FIG. 7. Once the third bale 300c is confirmed by the rear sensors 400a, 400b to have fully slid into place beneath the raised first and second bales and into contact with the blocking member 72 of the gate 70, the lift frames and bale-engaging devices are fully lowered again by collapse of the lift arm cylinders 98, as shown in FIG. 8, at which time actuation of the gate cylinder 78 to open the gate 70 is effected by the controller to allow gravitational ejection of the three stacked bales from the rear of the machine to the ground, as shown in FIG. 9.

It will be appreciated that although the above embodiment has been described in term of forming three-bale stacks as the normal default operation when no bale-feeding errors are detected, other embodiments may be configured to stack only a maximum of two bales, or stack more than three bales.

As shown in the illustrated embodiment, in addition to the rear set of rollers 62 on which each bale is seated at the stacking station, a separately mounted and independently height-adjustable rearmost roller 140 may be provided, for example mounted behind the rear cross-beam 22 by a respective pair of mounting brackets 142 that are attached to the rear footer beams 36, 38 of the upright support structures 24 at the sides of the trailer frame 12. The height adjustability of this roller may be provided in a similar manner to that described above for the grouped front and rear roller sets, where multiple bolt hole pairs at different heights are provided in the mounting brackets 142 such that the bearings that rotatably support this individual rearmost roller 140 can be attached to the mounting brackets 142 at different heights. The selectable heights preferably include a height at which the shared tangential plane of the rear roller set is also tangential with a topside circumferential point of the individual rearmost roller 140, and at least one height lower than this. Setting the rear roller in a position offset below the inclined plane of the grouped rear rollers 62 can be used to reduce the drop height from the accumulator to the ground in order to provide a smoother transition between the accumulator and the ground, for example to reduce potential tipping over of the stack of bales as it is released from the accumulator at notable travelling speeds.

The front sensor 404 may be mounted on a pair of incoming bale guides 144 that, as best shown in FIGS. 3 and 4, are attached to the front upright frame posts 26 of the upright support structures 24 and present inwardly directed vertical faces that flare laterally outward in the forward direction where they extend forwardly past the front upright frame posts 26 so as to encourage centering of the incoming bales from the baler as they enter the roller-equipped longitudinal pathway of the accumulator 10. The sensor 404 may comprise a transmitter/emitter mounted to the one incoming bale guide and a receiver/detector mounted to the other of the incoming bale guide, whereby interruption of a signal travelling from the transmitter to the receiver across the longitudinal roller path marks the presence of a bale or other object at the location of these devices along the longitudinal direction of the machine. The sensor components are mounted to the outer side of each bale guide so as not to protrude from the bale-contacting inner faces of the guides 144. As shown by the presence of multiple holes in the inward faces of the incoming bale guides 144, the sensor components may be mountable at a user-selectable one of several possible mounting sites in order to determine how far a bale reaches into the accumulator before setting of the front sensor, thereby allowing customization of the control system, for example to accommodate different bale lengths.

The rear electronic sensor 400a may similarly be mounted on outgoing bale guides 146 (FIG. 12) attached to the upright support structures and present inwardly directed vertical faces that flare laterally inward in the rearward direction where so as to encourage centering of the incoming bales from the baler. The rear mechanical sensor 400b may be mounted on an intermediate transverse support member 146 spanning between the support rails 58 of the rear roller set, as best shown in FIGS. 1 and 2, to place the contact member of the sensor switch in an open position reaching a short height above the tangential contact plane of the rear rollers from the space between an adjacent pair of the rear rollers for rearward pivoting of the contact down into a switch-closing position in the space between the rollers as the rear end of a bale moves rearwardly past the switch.

A set of ground wheels 150 rollably support the trailer frame 12 over the ground at a distance rearward from the front end of the accumulator frame 12, for example as represented by the pair of ground wheels situated intermediately of the two trailer frame ends, but nearer the rear end thereof, in the illustrated embodiment. In addition to the above described adjustability of the rear roller set inclination angle relative to the frame, which allows an owner/operator to choose angle of incline to adjust the speed at which the bales are gravitationally conveyed to the stacking station, a mechanism for adjusting the height of the ground wheel axes relative to the frame may also be provided to allow adjustment of the downward and rearward angle of incline of the trailer frame itself, thereby also contributing to user-adjustment of the roller plane's angle of inclination to control the speed of bale travel along, and subsequently off the rear end of, the machine.

For optimal following of the towed accumulator behind the baler, the illustrated embodiment employs castering ground wheels, where a lateral overhead support 152 attached to the respective upright support frame 24 extends laterally outward therefrom in the transverse direction and an axle support arm 154 depends downward from the overhead support 152 near the outer end thereof. The axle support arm 154 freely swivels on an upright axis of its connection to the overhead support 152, and carries a horizontal stub shaft or axle 155 on which the respective ground wheel 150 is rotatably supported near the lower end of the axle support arm.

The height adjustability of one of the ground wheels 150 is most visible in FIG. 15, which shows a mounting plate 156 fixed in place between the two intermediate upright frame members 32, 34 of the respective upright support structure 24 to lie in a vertical plane at the side of the machine. The plate features bolt holes 157 therein by which a corresponding vertical plate at the inner end of the overhead support 152 of the wheel assembly is bolted. The bolt holes in the mounting plate 156 are laid out to present at least two duplicated sets of a bolt hole pattern found in the wheel assembly plate, and each bolt hole set in the mounting plate 156 resides at a different respective height relative to the trailer frame 12. Accordingly, the wheel assembly plate can be mounted at any selectable one of a number of different heights relative to the trailer frame, thereby likewise setting the position of the wheel axle relative to the trailer frame to one of a number of heights. Although only one wheel height adjustment arrangement is shown, a matching set of mounting and wheel assembly plates is used at the other side of the machine, whereby the two ground wheels are set at the same height relative to the trailer frame in order to set the rear-end height of the trailer frame relative to the ground, and thereby set the trailer frame's angle of inclination.

As with the height adjustment of the roller support rails, multiple fastening point heights may be defined on either one or both of the elements concerned (i.e. the mounting plate and/or the wheel assembly plate). That is, while the illustrated embodiment employs a single bolt hole set in the wheel assembly plate, and multiple bolt hole sets in the mounting plate, the reverse arrangement may be employed, just as multiple bolt hole sets in both plates is possible. Alternatively, other wheel height-adjustment mechanisms may be employed.

Turning back to FIG. 11, a transition plate 160 is carried at a position situated in front of the forwardmost one of the front rollers 54 by a pair of L-shaped or J-shaped rail extensions 162 respectively fastened to the front support rails 52 to extend longitudinally therefrom before turning a short distance upwardly to carry the transition plate 160 in a transverse position parallel to the rollers 54, 62. Upwardly extending slots 164 in the upturned ends of the rail extensions 162 align with bolt holes in a pair of vertically oriented end brackets 166 depending downwardly from the transition plate 160 near the ends thereof, whereby the height of the transition plate 160 can be adjusted relative to the rail extensions 162, and thus relative to the plane of the front support rails 52 and the front rollers carried thereon. Longitudinal slots 168 in the longitudinal portion of each rail extension are provided near the rear end thereof that overlies the side of the respective front support rail for alignment with bolt holes in the front support rails, whereby the extensions can be adjusted forward and rearward relative to the front support rails to adjust the distance by which they reach forward therefrom to support the transition plate 160. Accordingly, the user can tighten the bolts at a selected position to set a desired position of the transition plate in the longitudinal direction. The illustrated embodiment shows a number of longitudinal slots that exceed the number of bolt holes used to fasten the extensions, whereby longitudinal adjustment is possible through both relative sliding along the slots, and selection from among different alienable openings.

Figure 14:
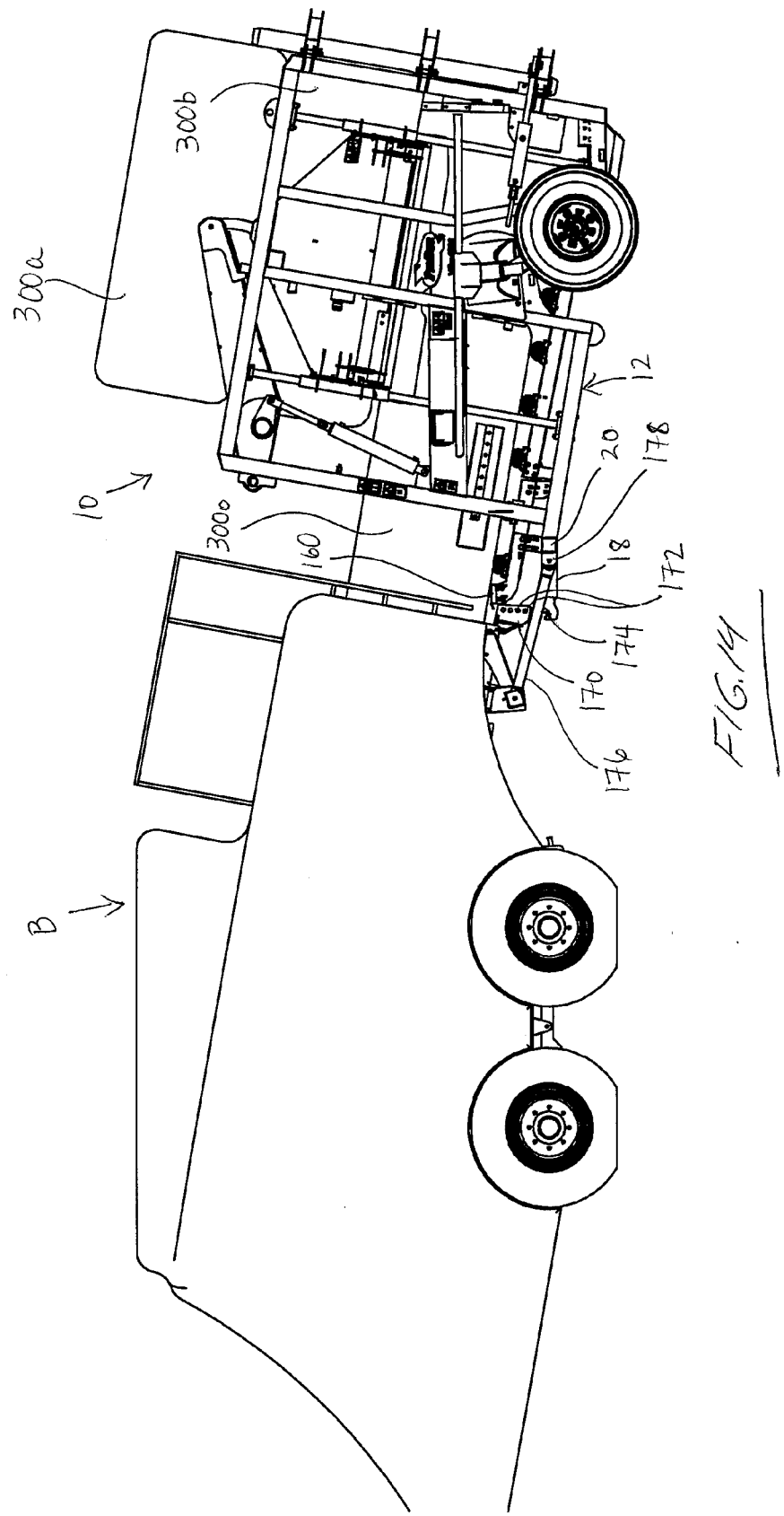
FIG. 14 schematically illustrates use the accumulator in use in a towed position behind a baler.

With reference to FIG. 14, the transition plate 160 helps the bales 300a, 300b, 300c transition smoothly from the baler B to the rollers of the accumulator. The bolt-on rail extensions can easily be detached from the trailer frame to remove the transition plate for baler models in which the position of the hitch H and its cooperation with the hitch connection 18 of the accumulator sets the forwardmost roller of the accumulator close enough to the baler output that the transition plate is not required. For other baler models, with a larger gap between the baler output and accumulator rollers, the transition plate may be required to avoid damage to or jamming of the bale as it exits the baler B and transitions onto the rollers, particularly since it is known that the bales from some balers are still undergoing compression into their final form as they initially start to eject from the rear of the baler. The transition plate 160 helps support the fluffy rear end of such bales. The height adjustability of the transition plate accommodates varying heights between the baler output and baler hitch among different brands and models of balers.

With continued reference to FIG. 14, the accumulator 10 is preferably sold to the customer in combination with hitch H that includes a hitch mount 170 for attachment to an underside of the baler B at the outlet end thereof. Different models of the hitch mount 170 may be produced with different mounting details for different models of balers. Each hitch mount features a series of vertically spaced holes 172 therein for pinned connection of a linking member 174 to the hitch mount at any selected one of the holes 170. The linking member extends downward from the mount and connects to the hitch connection 18 of the accumulator 10. Accordingly, selection from among the different pin holes 170 allows the operator to set the height at which the hitch connection 18 resides relative to the outlet of the baler B. As shown, the hitch may further incorporate stabilizer bars 176 (only one of which is visible in FIG. 14) that each extend rearwardly from the underside of the baler B to pivotally connect to a pair forward projecting lugs 178 at a respective end of the front end cross-beam 20 of the accumulator's trailer frame 12.

Since various modifications can be made in my invention as herein above described, it is intended that all matter contained in the accompanying specification shall be interpreted as illustrative only and not in a limiting sense.

The invention claimed is:

1. A vertical stacking bale accumulator comprising:
a trailer frame having opposing front and rear ends spaced apart in a longitudinal direction and opposing sides horizontally spaced apart in a transverse direction;
a hitch connection mounted to the front end of the trailer frame for coupling the accumulator to a tow hitch of a baler;
a series of non-powered rollers lying transversely of the trailer frame and spaced apart from one another along the longitudinal direction from adjacent the front end of the trailer frame to adjacent the end of the trailer frame, the series of non-powered rollers including front and rear groups of rollers residing respectively adjacent the front and rear ends of the trailer frame;
a bale stacking mechanism installed on the frame and arranged to automatically maneuver sequentially-received individual bales into a stacked configuration atop the rear group of rollers;
a rear gate movably carried on the frame proximate the rear end thereof for movement between a closed position obstructing deployment of the bales from the rear end of the trailer frame and an open position allowing deployment of the bales from the rear end of the trailer frame; and
a control system arranged to automatically move the rear gate from the closed position to the open position upon accumulation of a predetermined number of stacked bales atop the rear group of rollers;
wherein the trailer frame, the hitch connection, the ground wheels and the series of non-powered rollers are positioned relative to one another in a manner placing the rear group of rollers in an order of sequentially descending elevation toward the rear end of the trailer frame with the hitch connection coupled to the baler so as to gravitationally bias the bales toward the rear end of the trailer frame; and wherein the rear gate comprises an upright blocking member and at least one bracket carrying said blocking member at a position adjacent the rear end of the frame and a respective one of the sides thereof, the bracket being pivotally supported for pivotal movement thereof about an upright axis and having a curved shape reaching rearwardly and inwardly to face concavely toward the front end of the frame in the closed position to place the upright blocking member at an intermediate location between the opposing sides of the frame.

2. The vertical stacking bale accumulator of claim 1 wherein the bale stacking mechanism and the control system are arranged to lift an initial bale into an elevated state from atop the rear of rollers upon arrival of said initial bale at said rear group of rollers from the front group of rollers, to maintain said elevated state of the initial bale until a next bale arrives at said rear group of rollers, and release said initial bale onto said next bale, and wherein the control system comprises front and rear sensors positioned respective adjacent the front and rear ends of the trailer frame to detect presence of bales on the front and rear groups of non-powered rollers, and the control system is arranged to automatically open the rear gate upon detecting simultaneous presence of bales at both the front and rear groups of rollers.

3. The vertical stacking bale accumulator of claim 1 wherein the rear gate is adjustable in position to accommodate varying bale lengths by adjusting a distance between the rear gate and the front end of the trailer frame in the longitudinal direction thereof.

4. The vertical stacking bale accumulator of claim 1 wherein the rear gate comprises a shear pin connection arranged to release the gate from the closed position under application of a predetermined rearward force by one or more bales stacked atop the rear group of rollers.

5. The vertical stacking bale accumulator of claim 1 wherein at least some of the series of non-powered rollers are adjustable in position relative to the frame to adjust a slope of a travel path followed by the bales over said at least some of the series of non-powered rollers.

6. A vertical stacking bale accumulator comprising:
a trailer frame having opposing front and rear ends spaced apart in a longitudinal direction and opposing sides horizontally spaced apart in a transverse direction;
a hitch connection mounted to the front end of the trailer frame for coupling the accumulator to a tow hitch of a baler;
a set of ground wheels rollably supporting the trailer frame adjacent the opposing sides thereof proximate the rear end of the trailer frame;
a series of non-powered rollers lying transversely of the trailer frame and spaced apart from one another along the longitudinal direction from adjacent the front end of the trailer frame to adjacent the rear end of the trailer frame, the series of non-powered rollers including front and rear groups of rollers residing respectively adjacent the front and rear ends of the trailer frame;
a bale stacking mechanism installed on the trailer frame and arranged to automatically maneuver sequentially-received individual bales into a stacked configuration atop the rear rollers;
a rear gate movably carried on the trailer frame proximate the rear end thereof for movement between a closed position obstructing deployment of the bales from the rear end of the trailer frame and an open position allowing deployment of the bales from the rear end of the trailer frame; and a control system arranged to automatically move the rear gate from the closed position to the open position upon accumulation of a predetermined number of stacked bales atop the rear rollers;
wherein the trailer frame, the hitch connection, the ground wheels and the series of non-powered rollers are positioned relative to one another in a manner placing the rear group of rollers in an order of sequentially descending elevation toward the rear end of the trailer frame with the hitch connection coupled to the baler so as to gravitationally bias the bales toward the rear end of the trailer frame; and
wherein the front and rear groups of the non-powered rollers are independently adjustable in position relative to the frame to adjust a slope of respective travel paths followed by the bales over said front and rear groups of the non-powered rollers.

7. The vertical stacking bale accumulator of claim 6 comprising an additional rear discharge roller situated rearwardly beyond the rear group of rollers and adjustable in height relative to the frame independently of the front and rear groups of rollers.

8. The vertical stacking bale accumulator of claim 6 wherein the ground wheels are adjustable in height relative to the trailer frame to adjust angle of inclination of the trailer frame relative to ground for a given height of a particular baler hitch.

9. The vertical stacking bale the vertical stacking bale accumulator of claim 6 in combination with a hitch mount for installation on the baler, the hitch mount comprising a plurality of selectable connections points via which the hitch connection of the accumulator is connectable to the hitch mount, the plurality of connection points being vertically spaced from one another such that selection from among said plurality of connection points sets a height of the hitch connection of the accumulator relative to the baler.

10. The vertical stacking bale accumulator of claim 6 comprising a bale transition plate carried forwardly of the front group of rollers to provide a sliding support surface over which bales transition from the baler to the front group of rollers.

11. The vertical stacking bale accumulator of claim 10 wherein the bale transition plate is adjustable in position relative to the trailer frame.

12. A vertical stacking bale accumulator comprising:
a frame having a bale conveyance path running in a longitudinal direction for movement of bales in said longitudinal direction toward a stacking area of said conveyance path;
a pair of upright support structures spaced apart from one another in a transverse direction across the stacking area of said conveyance path, each upright support structure comprising a pair of upright guide members spaced apart from one another in the longitudinal direction on the same side of the conveyance path
a lift arm arrangement comprising at least one lift arm having a pivotal connection at an elevation above the conveyance path for movement of the lift arm arrangement about a pivot axis lying in the transverse direction;
at least one actuator carried on the trailer frame and arranged to effect pivoting of the lift arm arrangement about the pivot axis;
a pair of lift frames spaced apart from one another in the transverse direction across the stacking area of said conveyance path and suspended from the lift arm arrangement adjacent a lifting end thereof distal to the pivot axis, each lift frame comprising a pair of followers attached thereto at longitudinally opposite ends of the lift frame, each follower being engaged to a respective one of the upright guide members for constrained movement upward and downward therealong; and a pair of bale engaging devices respectively carried on the pair of lifting frames and operable to engage an initial bale seated atop the stacking area of said conveyance path from opposing sides thereof for subsequent lifting of said bale from the stacking area of the conveyance path by raising of the lifting end of the lift arm arrangement by the at least one actuator to accommodate conveyance of a next incoming bale into the stacking area beneath the initial bale.

13. The vertical stacking bale accumulator of claim 12 wherein the lift arm arrangement comprises two lift arms from which the pair of lift frames are respectively suspended and two actuators that each drive motion of a respective one of the lift arms about the pivot axis, each lift arm being positioned on a respective side of the bale conveyance path.

14. The vertical stacking bale accumulator of claim 12 wherein each lift frame comprises a panel lying longitudinally of the frame at an elevation proximate the stacking area of the conveyance path with the lift arms and the lift frames in lowered positions to block a first bale arriving at the stacking area from overshooting either of the opposing sides of the conveyance path.

15. The vertical stacking bale accumulator of claim 12 wherein each bale engaging device comprises at least one lifter that is pivotal about a longitudinal axis, is biased by a spring force into a default position in which a free edge of a lift pad of said lifter points inwardly toward a transverse center of the conveyance path, and is movable against the spring force into a retracted position in which the free edge is tilted upward and transversely outward relative to the default position, whereby the retracted positions of the lift pads clear the opposing sides of the bale during downward movement therealong to the lowered position, at which point the lift pads return to the default position to reach under the bale from the opposing sides thereof for lifting of the bale.

16. The vertical stacking bale accumulator of claim 15 wherein each lift pad is elongated in the longitudinal direction to span at least a majority length of each bale.

17. The vertical stacking bale accumulator of claim 15 wherein an underside of each lifter that faces downward and transversely inward in the default position of the lifter is concavely contoured.

18. The vertical stacking bale accumulator of claim 12 wherein:
the frame is a trailer frame having opposing front and rear ends spaced apart in the longitudinal direction and opposing sides horizontally spaced apart in a transverse direction;
a hitch connection is mounted to the front end of the trailer frame for coupling the accumulator to a tow hitch of a baler;
a set of ground wheels rollably support the trailer frame proximate the rear end thereof;
the conveyance path comprises a series of non-powered rollers lying transversely of the trailer frame and spaced apart from one another along the longitudinal direction from adjacent the front end of the trailer frame to adjacent the end of the trailer frame, the series of non-powered rollers including a front group of rollers residing adjacent the front end of the trailer frame and a rear group of rollers residing adjacent the rear end of the trailer frame at the stacking area;
a control system is arranged to automatically move the rear gate from the closed position to the open position upon accumulation of a predetermined number of stacked bales atop the rear rollers; and
the trailer frame, the hitch connection, the ground wheels and the series of non-powered rollers are positioned relative to one another in a manner placing the rear group of rollers in an order of sequentially descending elevation toward the rear end of the trailer frame with the hitch connection coupled to the baler so as to gravitationally bias the bales toward the rear end of the trailer frame.

19. A vertical stacking bale accumulator comprising:
a frame having a bale conveyance path running in a longitudinal direction for movement of bales in said longitudinal direction toward a stacking area of said conveyance path;
a pair of bale engaging devices respectively disposed on opposing sides of the stacking area of the conveyance path and each arranged for upward and downward displacement relative to the conveyance path into and out of a lowered position and for engagement of an initial bale seated at the stacking area from opposing sides thereof while in the lowered position for subsequent lifting of said bale from said stacking area of the conveyance path by raising of the bale engaging devices to accommodate conveyance of a next incoming bale into the stacking area beneath the initial bale; and
a pair of bale guides suspended respectively the bale engaging devices and extending in the longitudinal direction to block movement of the next incoming bale from overshooting either of the opposing sides of the conveyance path;
wherein each bale guide comprises a downwardly tapered portion that narrows in a direction moving away from a top end of the bale guide toward a bottom end thereof.

* * * * *